United States Patent
Chen et al.

(10) Patent No.: US 7,017,104 B1
(45) Date of Patent: Mar. 21, 2006

(54) METHOD AND SYSTEM FOR DECODING BLOCK CODES BY CALCULATING A PATH METRIC ACCORDING TO A DECISION FEEDBACK SEQUENCE ESTIMATION ALGORITHM

(75) Inventors: Tsung Hui Chen, Hsinchu (TW); Chi Chao Chao, Hsinchu (TW); Mao Ching Chiu, Hsinchu (TW); Chao Ming Chang, Hsinchu (TW)

(73) Assignee: Mediatek Inc., Hsinchu (TW)

( * ) Notice: Subject to any disclaimer, the term of this patent is extended or adjusted under 35 U.S.C. 154(b) by 386 days.

(21) Appl. No.: 10/227,093

(22) Filed: Aug. 21, 2002

Related U.S. Application Data

(60) Provisional application No. 60/395,288, filed on Jul. 12, 2002, provisional application No. 60/314,757, filed on Aug. 24, 2001.

(51) Int. Cl.
*H04L 1/20* (2006.01)
*H04L 27/01* (2006.01)

(52) U.S. Cl. ............... 714/796; 375/235; 375/341; 375/348

(58) Field of Classification Search ........... 714/796, 714/792, 794, 795, 780; 375/341, 346, 350, 375/232, 235, 348
See application file for complete search history.

(56) References Cited

U.S. PATENT DOCUMENTS

| | | | | |
|---|---|---|---|---|
| 5,305,349 A | * | 4/1994 | Dent | 370/209 |
| 5,710,793 A | * | 1/1998 | Greenberg | 375/232 |
| 5,841,813 A | | 11/1998 | van Nee | |
| 5,862,156 A | * | 1/1999 | Huszar et al. | 714/795 |
| 5,862,182 A | | 1/1999 | Awater et al. | |
| 5,870,414 A | * | 2/1999 | Chaib et al. | 714/792 |
| 6,005,840 A | | 12/1999 | Awater et al. | |
| 6,012,161 A | * | 1/2000 | Ariyavisitakul et al. | 714/795 |
| 6,016,330 A | * | 1/2000 | Ashley et al. | 375/341 |
| 6,125,136 A | * | 9/2000 | Jones et al. | 375/147 |
| 6,205,187 B1 | * | 3/2001 | Westfall | 375/341 |
| 6,215,813 B1 | * | 4/2001 | Jones et al. | 375/146 |
| 6,219,388 B1 | * | 4/2001 | Tanada et al. | 375/341 |
| 6,233,271 B1 | * | 5/2001 | Jones et al. | 375/142 |
| 6,233,273 B1 | * | 5/2001 | Webster et al. | 375/148 |
| 6,237,016 B1 | * | 5/2001 | Fischer et al. | 708/622 |
| 6,249,544 B1 | * | 6/2001 | Azazzi et al. | 375/233 |
| 6,327,317 B1 | * | 12/2001 | Chennakeshu et al. | 375/341 |
| 6,421,378 B1 | * | 7/2002 | Fukuoka et al. | 375/229 |

(Continued)

FOREIGN PATENT DOCUMENTS

EP 0413 505 A1 2/1991

(Continued)

OTHER PUBLICATIONS

Thorlby, J., et al., "Enhanced trellis decoding of short BCM based on Galois Fields in ISI", IEE Colloquium on Multipath Countermeasures, May 23, 1996, pp. 9/1-9/6.*

(Continued)

*Primary Examiner*—Stephen M. Baker
(74) *Attorney, Agent, or Firm*—Thomas, Kayden, Horstemeyer & Risley

(57) ABSTRACT

A method and system are disclosed that provide a more efficient decoder for decoding block codes such as a complementary code keying (CCK) code. A receiver receives a signal containing at least one block codeword. A decoder decodes the block codeword contained in the received signal by finding a path in a trellis diagram with a calculated path metric that accounts for intersymbol interference (ISI). The path metric can be based on a branch metric that is calculated according to a decision feedback sequence estimation algorithm.

24 Claims, 18 Drawing Sheets

U.S. PATENT DOCUMENTS

| | | | |
|---|---|---|---|
| 6,434,111 B1 * | 8/2002 | Voyer et al. ................ | 370/203 |
| 6,535,554 B1 * | 3/2003 | Webster et al. ............. | 375/233 |
| 6,563,892 B1 * | 5/2003 | Haartsen et al. ............ | 375/350 |
| 6,654,365 B1 * | 11/2003 | Sylvester et al. ........... | 370/342 |
| 6,690,715 B1 * | 2/2004 | Webster et al. ............. | 375/148 |
| 6,707,850 B1 * | 3/2004 | Blake et al. ................ | 375/233 |
| 6,734,920 B1 * | 5/2004 | Ghosh et al. ............... | 348/614 |
| 6,775,260 B1 * | 8/2004 | Dabak et al. ............... | 370/342 |
| 6,775,334 B1 * | 8/2004 | Liu et al. .................... | 375/341 |
| 6,810,093 B1 * | 10/2004 | Zeng .......................... | 375/340 |
| 6,823,489 B1 * | 11/2004 | Wittig et al. ................ | 714/792 |

FOREIGN PATENT DOCUMENTS

| | | |
|---|---|---|
| EP | 1148 677 A2 | 10/2001 |

OTHER PUBLICATIONS

Manoukian, H., et al., "BCJR trellis construction for binary linear block codes", IEE Proc. Commun., vol. 144, No. 6, Dec. 1997, pp. 367-371.*

Halford, Karen et al., "Complementary Code Keying for Rake-Based Indoor Wireless Communication," *Proceedings of the 1999 IEEE International Symposium on Circuits and Systems*, Orlando, Florida, May 30-Jun. 2, 1999, vol. 4 of 6, pp. 427-430.

"Part 11: Wireless LAN Medium Access Control (MAC) and Physical Layer (PHY) specifications: Higher-Speed Physical Layer Extension in the 2.4 GHz Band," *IEEE Standard 802.11B-1999 (Supplement to ANSI/IEEE Standard 802.11, 1999 Edition)*, The Institute of Electrical and Electronics Engineers, Inc., New York, New York, published Jan. 20, 2000, pp. 1-89.

Pearson, Bob, "Complementary Code Keying Made Simple," *Intersil*™, Application Note 9850, 2001, pp. 1-6.

Sun, Jian, "Complementary Code Keying Modulation," http://www.csee.wvu.edu/~jian/ck.htm, Lane Department of Electrical Engineering, West Virginia University, printed Jun. 24, 2002, 3 pages.

Swaminathan, Sriram et al., "A Dynamically Reconfigurable Adaptive Viterbi Decoder," Department of Electrical and Computer Engineering, University of Massachusetts, Amherst, MA, *FPGA '02*, Feb. 24-26, 2002, 10 pages.

Viterbi, Andrew J., "Error Bounds for Convolutional Codes and an Asymptotically Optimum Decoding Algorithm," *IEEE Transactions on Information Theory*, vol. IT-13, No. 2, Apr. 1967, pp. 260-269.

* cited by examiner

METHOD AND SYSTEM FOR DECODING BLOCK CODES BY CALCULATING A PATH METRIC ACCORDING TO A DECISION FEEDBACK SEQUENCE ESTIMATION ALGORITHM

RELATED APPLICATIONS

This application claims priority to U.S. Provisional Application No. 60/395,288, entitled "METHOD AND SYSTEM FOR DECODING CCK CODEWORDS BY CALCULATING A BRANCH METRIC ACCORDING TO A DECISION FEEDBACK SEQUENCE ESTIMATION ALGORITHM," filed on Jul. 12, 2002, and to U.S. Provisional Application No. 60/314,757, entitled "METHOD AND APPARATUS FOR A COMMUNICATION SYSTEM USING COMPLEMENTARY CODE KEYING AND BARKER SEQUENCE MODULATION," filed on Aug. 24, 2001, which are hereby expressly incorporated herein by reference. This application is also related to U.S. patent application Ser. No. 10/227,080, entitled "METHOD AND SYSTEM FOR DECODING BLOCK CODES," filed on Aug. 21, 2002, which is hereby expressly incorporated herein by reference and commonly owned by the same assignee of this application.

FIELD

This invention relates generally to wireless communications and, more particularly, to a method and system for decoding block codes by calculating a path metric according to a decision feedback sequence estimation algorithm.

BACKGROUND

The wide spread use of wireless devices in a network environment has increased the demand for wireless local area networks ("WLANs") to provide high data rates at low cost. Complementary Code Keying (CCK) is one communication technique that can be used to meet this demand. CCK uses complementary polyphase codes for modulating digital information, which has been adopted by IEEE 802.11b as the modulation scheme for WLANs operating at 5.5 Mbit/s and 11 Mbit/s data rates in a 2.4 GHz band. These type of codes provide complementary sequences ("symbols") having phase parameters, and possess symmetry ideal for transmitting digital information. Typically, at a high data rate of 11 Mbit/s, the codes are grouped as "codewords" having 8-chips or a code length of 8. These codewords are a type of block code ("block codewords"). In this case, 256 possible combinations of codewords may be used. Communication systems can thus extract digital information from a received signal modulated with CCK codewords by decoding the CCK codewords.

One prior complementary code decoder is described in U.S. Pat. No. 5,841,813 to van Nee and U.S. Pat. No. 5,862,182 to Awater et al., which extracts information data of a CCK codeword by correlating different samples of the received signal. For such a decoder, the signal-to-noise ratios degrade significantly after the differential correlators. Additionally, the decoder is not applicable for transmission of CCK codes in multipath environments.

One possible decoding scheme for block codes is to match the received signal with all possible code patterns by correlators. A disadvantage of such a decoding scheme is that its complexity increases if the size of the block code is too large. Furthermore, this is an inefficient manner of decoding block codes such as CCK code. A low-complexity decoder for CCK was introduced by M. Webster and C. Andren, *Harris/Lucent CCK description: additional cover code and fast transform detail*, IEEE 802.11-98/331, September 1998, in which only a subset of CCK codewords are required to be correlated with the received signal by using a fast Walsh transform. However, this type of low-complexity decoder does not adequately address the problems caused by interference in multipath environments when decoding CCK codes.

For instance, in multipath environments such as inside an office building, the delay spread of a received signal can cause interference during decoding of CCK codes and symbols within each CCK codeword contained in the received signal. In particular, multipath distortion caused by signals being reflected off of walls within the building can result in propagation delay of the received signal. This type of distortion or interference regarding CCK codewords is referred to as inter-symbol interference (ISI). Two types of ISI can occur: inter-codeword interference and intra-codeword interference. Inter-codeword interference is signal interference between codewords. Intra-codeword interference is signal interference between symbols within a codeword.

One prior receiver is described in U.S. Pat. No. 6,233,273 to Webster et al. that deals with inter-codeword and intra-codeword interference. This receiver is a channel-matched correlation receiver ("RAKE") that uses a decision feedback equalizer to mitigate the effects of multipath distortion. A disadvantage of this receiver is that it requires high signal-to-noise ratios, but at low-signal-to-noise ratios error propagation in the decision feedback equalizer causes chip errors to occur in bursts. This degrades the reliability of decoding CCK codewords. Thus, to handle low signal-to-noise ratios, the RAKE receiver is required to examine all received codeword chips prior to making a codeword decision, which is an inefficient manner of decoding CCK codewords.

One prior decoding technique has been introduced to decode and correct errors found in a signal encoded by a convolutional code. Convolutional code, unlike CCK codewords, is a continuous stream of data such as satellite data. This technique is commonly referred to as "Viterbi Decoding" that uses a trellis diagram to find a maximum-likelihood path recursively over the trellis diagram to decode convolutional data, as described in A. J. Viterbi, *Error bounds for convolutional codes and an asymptotically optimum decoding algorithm*, IEEE Transactions on Information Theory, vol. IT-13, pp. 260–269, April 1967.

Thus, what is needed is a decoder that can use Viterbi decoding techniques in order to reduce the computational complexity for decoding block codes such as, for example, CCK codewords and to handle multipath distortion such as inter-codeword and intra-codeword interference.

SUMMARY

According to one aspect of the invention, a communication method is disclosed that receives a signal including at least one block codeword. The block codeword is decoded in the received signal by finding a path in a trellis diagram with a calculated path metric that accounts for intersymbol interference (ISI).

Thus, what is needed is a estimator that can use Viterbi estimating techniques in order to reduce the computational complexity for estimating block codes such as, for example, CCK codewords and to handle multipath distortion such as inter-codeword and intra-codeword interference.

According to one aspect of the invention, a communication method is disclosed that receives a signal including at least one block codeword. The block codeword is estimated in the received signal by finding a path in a trellis diagram with a calculated path metric that accounts for intersymbol interference (ISI).

According to another aspect of the invention, a communication device is disclosed that includes a receiver and an estimator. The receiver is to receive a signal including at least one block codeword. The estimator is to estimate the block codeword contained in the received signal by finding a path in a trellis diagram with a calculated path metric that accounts for intersymbol interference (ISI).

According to another aspect of the invention, a digital processing system is disclosed comprising at least one memory device and a processing unit. The memory device is to store data related to a trellis diagram. The processing unit is to estimate a block codeword contained in a signal using the data related to the trellis diagram.

According to another aspect of the invention, a receiver is disclosed including an estimator to estimate block codewords contained in a signal using a trellis diagram representing a plurality of branches between states in a plurality of sections of the trellis diagram, each branch representing a symbol combination for a block codeword including at least one symbol. The estimator decoder includes a memory, equalizer and metric calculator, selecting unit, and a block codeword decision element. The memory is to store data relating to a surviving path between a state $s_0$ and a state $s_{k-1}$ in the trellis diagram, wherein $s_0$ is the initial state in the trellis diagram and $s_{k-1}$ is a previous state of a current state in question to determine a path in the trellis diagram. The equalizer and metric calculator is to eqlize the received symbols and calculate a branch metric for possible branches emanating from state $s_{k-1}$ in the trellis diagram using a received symbol within a block codeword, a channel impulse response value, the data relating to the surviving path, and previously estimated block codewords. The selecting unit is to add the calculated branch metric for the possible branches emanating from state $s_{k-1}$ to state $s_k$ to a metric of the surviving path from state $s_0$ to state $s_{k-1}$ that generates path metrics for the possible paths emanating from state $s_0$ to $s_k$, compare the path metrics for the possible paths to determine a smallest path metric, and select the path in the trellis diagram associated with the smallest path metric. The block codeword decision element is to determine the block codeword using the selected path.

According to another aspect of the invention, an equalizer and metric calculator is disclosed in an estimater for estimating block codewords contained in a received signal. The equalizer and metric calculator is to calculate a branch metric for a branch emanating from a state in a trellis diagram, the metric calculator comprises a first, second, and third filter sets. The first filter set is to estimate intersymbol interference ($ISI_A$) based on previously estimated codewords and a channel impulse response and to subtract the estimated $ISI_A$ from a received symbol in a block codeword. The second filter set is to estimate intersymbol interference ($ISI_B$) based on a surviving path in the trellis diagram and the channel impulse response and subtract the estimated $ISI_B$ from the output of the first filter set. The third filter set is to estimate an intersymbol interference ($ISI_C$) and a received symbol candidate based on symbols associated with a branch and the channel impulse response and subtract the estimated $ISI_C$ and received symbol candidate from the output of the second filter set, and calculate a distance measurement between the received symbol and received symbol candidate and the estimated overall ISI in order to provides the branch metric.

According to another aspect of the invention, an equalizer and metric calculator is disclosed in a estimator for estimating block codewords contained in a received signal. The equalizer and metric calculator is to calculate a branch metric for a branch emanating from a state in a trellis diagram. The equalizer and metric calculator comprises a demultiplexer, first, second, and third filter sets, a plurality of processing units, and an adder. The demultiplexer is to receive a plurality of symbols in a block codeword and to output a first set of symbols at a time first duration and a second set of symbols at a second time duration. The first filter set is to estimate intersymbol interference at the first and second time durations based on a previously estimated codeword and a channel impulse response ($ISI_A$) and to subtract the estimated $ISI_A$ for the first and second durations from the output of the first filter set at the first and second times durations, respectively. The second filter set is to estimate intersymbol interference ($ISI_B$) based on symbols of a surviving path in the trellis diagram and on a channel impulse response, and subtract the estimated $ISI_B$ of the first and second time durations from the output of the second filter set at the first and second time durations, respectively. The third filter set is to estimate a received symbol candidate and estimate intersymbol interference ($ISI_C$) based on symbols of associated with a branch and channel impulse response, subtract the estimated $ISI_C$ and received symbol candidates of the first and second time durations from the estimated $ISI_B$ of the first and second time durations. The plurality of processing units are to calculate a distance measurement between real and imaginary parts of the received symbol and received symbol candidate and estimated overall ISI. The adder is to add the outputs of the processing units that provides the branch metric.

According to another aspect of the invention, a method is disclosed for estimating a block codeword contained in a received signal by finding a smallest path metric in a trellis diagram. According to another aspect of the invention, a multiplier for a block code estimator decoder is disclosed.

The multipler comprises a selector circuit to perform a complex number multiplicpation by selecting a complex number from a predetermined set of complex numbers based on varying impulse response values and symbol values.

Other features and advantages of the invention will be apparent from the accompanying drawings, and from the detailed description, which follows below.

BRIEF DESCRIPTION OF THE DRAWINGS

The accompanying drawings, which are incorporated in, and constitute a part of, this specification illustrate exemplary implementations of the invention and, together with the detailed description, serve to explain the principles of the invention. In the drawings.

DETAILED DESCRIPTION

Figure 1:
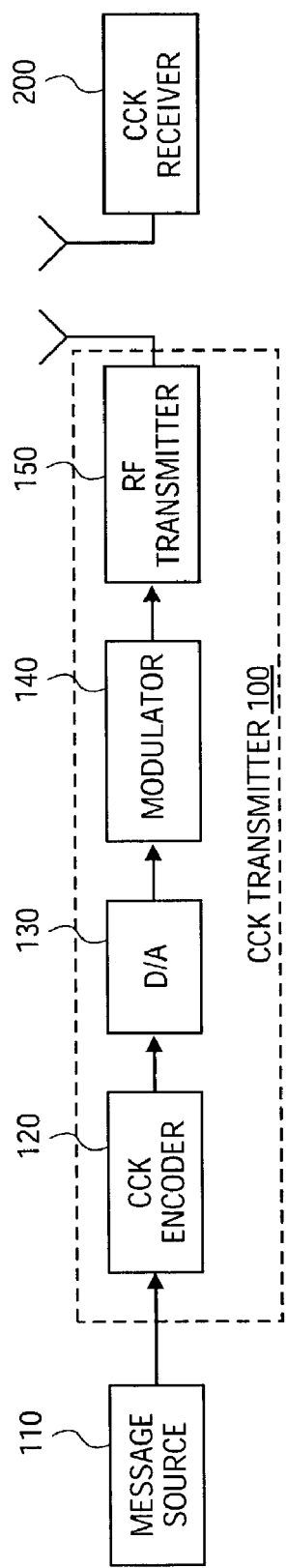
FIG. 1 illustrates an exemplary block diagram of a CCK transmitter and receiver in which the invention can be implemented.

Reference will now be made in detail to implementations of the invention, examples of which are illustrated in the accompanying drawings. Wherever possible, the same reference numbers will be used throughout the drawings to refer to the same or like parts.

The following implementations disclose a more efficient estimator that can estimate block codewords contained in a received signal by finding a path in a trellis diagram with a calculated path metric that accounts for intersymbol interference (ISI). The path metric can be based on calculated branch metrics according to a decision feedback sequence estimation algorithm. Each path in the trellis diagram can represent a possible block codeword and have an associated path metric. The path having the smallest path metric is used to determine the decoded block codeword. Thus, by finding a path in the trellis diagram using the smallest path metric, estimating the block code can be performed more efficiently.

In the following description, a "block code" can refer to any type of block codeword having a collection of codewords of a fixed length. For example, a CCK code can be one type of block codeword of length 8 thereby providing 256 possible combinations of codewords for high-rate CCK modulation. Other types of codewords are described below. Additionally, source information bits can be mapped to one codeword within a specific block code. For example, 8 bits of source information can be mapped to a high-rate CCK codeword, which can have up to 256 distinct codewords for high-rate CCK modulated codes.

CCK Block Code

The following implementations and examples are described for estimating block codes such as complementary code keying (CCK) code. Nevertheless, the following implementations can be used to estimate other types of block codes such as a Barker sequence block code. For example, the following decoding techniques can be used with a trellis diagram having paths for all possible combinations of the Barker sequence code.

In the following description, a CCK codeword can be a block codeword having a code length of eight (8) having a chip rate of $f_{chip}$, and can be denoted as $c=\{c_1, c_2, c_3, c_4, c_5, c_6, c_7, c_8\}$ where $c_i$ represents the ith symbol of the CCK codeword c. Each symbol can represent a complex number. Nevertheless, the following implementations are not limited to a block code length of 8 and can be implemented for codewords having any block code length such that a trellis diagram is provided with a path for each possible combination of the block codewords. The following formula can be used to derive the CCK codeword c at a 5.5 Mbit/s low-rate modulation and a 11 Mbit/s high-rate modulation:

$$c=(e^{j(\phi_1+\phi_2+\phi_3+\phi_4)}, e^{j(\phi_1+\phi_3+\phi_4)}, e^{j(\phi_1+\phi_2+\phi_4)}, -e^{j(\phi_1+\phi_4)},$$
$$e^{j(\phi_1+\phi_2+\phi_3)}, e^{j(\phi_1+\phi_3)}, -e^{j(\phi_1+\phi_3)}, e^{j\phi_1})$$

where $\phi_i$ for i=1, 2, 3, 4 belong to quadrature phase-shift keying (QPSK) phases, i.e., $\phi_i \in \{0, \pi/2, \pi, 3\pi/2\}$ for i=1, 2, 3, 4. There are two types of CCK modulation modes: high-rate CCK modulation and low-rate CCK modulation.

High-Rate CCK Modulation

For the high-rate CCK modulation, 8 information bits ($d_0$ to $d_7$) are carried by each transmitted block codeword. In this manner, 256 possible block codeword combinations can be modulated in a signal. The block codewords can be generated by having $\phi_1, \phi_2, \phi_3,$ and $\phi_4$ range over all possible QPSK phases, i.e., $\phi_i \in \{0, \pi/2, \pi, 3\pi/2\}$, for i=1, 2, 3, 4. The four phases $\phi_1, \phi_2, \phi_3,$ and $\phi_4$ can be encoded by the 8 information bits $d_0$ to $d_7$. For example, $\phi_1$ may be encoded from ($d_0, d_1$) based on differential quadrature phase-shift keying (DQPSK), and $\phi_2, \phi_3,$ and $\phi_4$ may be encoded from ($d_2, d_3$), ($d_4, d_5$), and ($d_6, d_7$), respectively, based on QPSK.

Low-Rate CCK Modulation

For the low-rate CCK modulation, 4 information bits ($d_0$ to $d_3$) can be carried by each transmitted codeword. Therefore, there can be 16 codeword combinations for the low-rate CCK. The 16 codewords can be generated with $\phi_1, \phi_2, \phi_3,$ and $\phi_4$ ranging the possible phases specified by the following phase values:

$\phi_1 \in \{0, \pi/2, \pi, 3\pi/2\}$ $\phi_2 \in \{\pi/2, 3\pi/2\}$ $\phi_3 = 0$ $\phi_4 \in \{0, \pi\}$ The four phases $\phi_1, \phi_2, \phi_3,$ and $\phi_4$ are encoded by the 4 information bits $d_0$ to $d_3$. For example, $\phi_1$ may be encoded from ($d_0, d_1$) based on DQPSK, and $\phi_2, \phi_3,$ and $\phi_4$ may be encoded from ($d_2, d_3$) based on the following equations:

$\phi_2 = (d_2 \times \pi) + \pi/2$ $\phi_3 = 0$ $\phi_4 = d_3 \times \pi$

Thus, each CCK codeword can include 8 complex pulses ("chips") to carry 8 bits of information at a high-rate of 11 Mbit/s for transmitting the source data. At a low-rate of 5.5 Mbit/s, 4 bits of information can be mapped to the 8 bit CCK codeword for transmitting the source data.

Phase Representation

The set of all possible phases $\Omega = \{0, \pi/2, \pi, 3\pi/2\}$ for a CCK block codeword can be represented as a set of integers $Z_4 = \{0, 1, 2, 3\}$. The mapping from $Z_4$ to $\Omega$ can then be defined as $\lambda(u) = u\pi/2$, for $u \in Z_4$. A phase addition is then equivalent to a modulo-4 addition in $Z_4$. If the following is set for $u_1$ to $u_4$, $u_1 = 2\phi_1/\pi$ $u_2 = 2\phi_2/\pi$ $u_3 = 2\phi_3/\pi$ $u_4 = 2\phi_4/\pi$ then $u_1, u_2, u_3, u_4 \in Z_4$. In such a manner, a CCK block codeword can hence be represented as:

$$c = (e^{jp_1\pi/2}, e^{jp_2\pi/2}, e^{jp_3\pi/2}, e^{jp_4\pi/2}, e^{jp_5\pi/2}, e^{jp_6\pi/2}, e^{jp_7\pi/2}, e^{jp_8\pi/2})$$

where $p = (p_1, p_2, p_3, p_4, p_5, p_6, p_7, p_8)$ is the phase representation of the codeword and can be determined by $$p = (u_1, u_2, u_3, u_4) \begin{bmatrix} 11111111 \\ 10101010 \\ 11001100 \\ 11110000 \end{bmatrix} + (0, 0, 0, 2, 0, 0, 2, 0)$$

where all the additives are modulo-4.

Exemplary CCK Communication System

FIG. 1 illustrates an exemplary block diagram of a CCK transmitter 100 and receiver 200 in which the invention can be implemented. The CCK transmitter 100 includes a CCK encoder 120, digital-to-analog (D/A) converter 130, modulator 140, and radio frequency (RF) transmitter 150. The CCK encoder 120 receives data bits from a message source 110 and encodes the data bits into a CCK codeword. The CCK encoder 120 can use, e.g., the above formulas to encode the data bits into a CCK codeword c having eight symbols (i.e., complex numbers) represented as $\{c_1, c_2, c_3, c_4, c_5, c_6, c_7, c_8\}$ for low and high-rate CCK codewords. In another example, CCK encoder 120 can be an encoder as described in U.S. patent application Ser. No. 10/227,080, entitled "METHOD AND SYSTEM FOR DECODING BLOCK CODES," filed on Aug. 21, 2002, which is commonly owned by the same assignee of this application (hereafter "the '080 co-pending application"). Thus, CCK encoder 120 can be configured to encode Barker sequence block codewords. For purposes of explanation, in this example, the encoder 120 encodes CCK codewords.

The D/A converter 130 converts the individual symbols into an analog component. The modulator 140 generates a carrier signal for modulating the CCK codeword having signal properties derived from the analog components of the individual CCK codeword symbols. The RF transmitter 150 amplifies the carrier signal for transmitting the signal to the CCK receiver 200. The carrier signal can be modulated and transmitted, e.g., at a high-rate of 11 Mbit/s or a low-rate of 5 Mbit/s in accordance with the requirements of IEEE 802.11b for WLANs.

Figure 2:
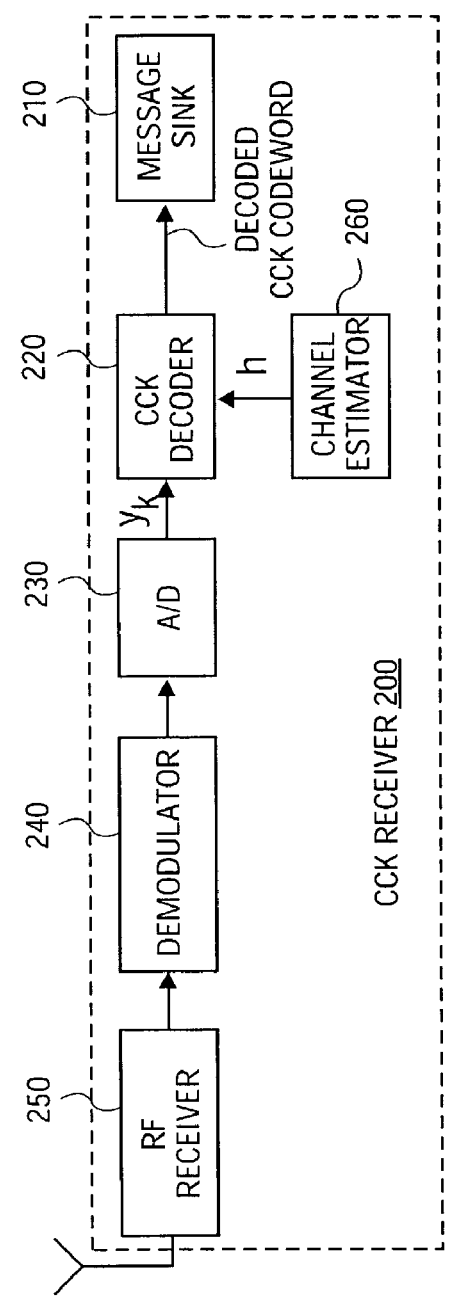
FIG. 2 illustrates one example detailed block diagram of the CCK receiver of FIG. 1.

FIG. 2 illustrates a detailed block diagram of the CCK receiver 200 of FIG. 1. The CCK receiver 200 includes a RF receiver 250, demodulator 240, analog-to-digital (A/D) converter 230, CCK estimator 220, channel estimator 260, and message sink 210. The RF receiver 250 receives the modulated carrier signal from the RF transmitter 150 of the CCK transmitter 100. The demodulator 240 extracts the individual symbols of the CCK codeword contained or embedded in the received carrier signal from RF receiver 250. The A/D converter 230 converts the extracted symbols of the CCK codeword from demodulator 240 into digital data to sent a received CCK codeword symbol having a symbol represented as "$y_k$." The CCK estimator 220 estimates CCK codewords using received CCK codeword symbols. In another example, the CCK receiver 200 can be configured with an interpolator, phase compensator, chap matched filter, down sampler, and timing/phase tracking as described in the '080 co-pending application.

Figure 3:
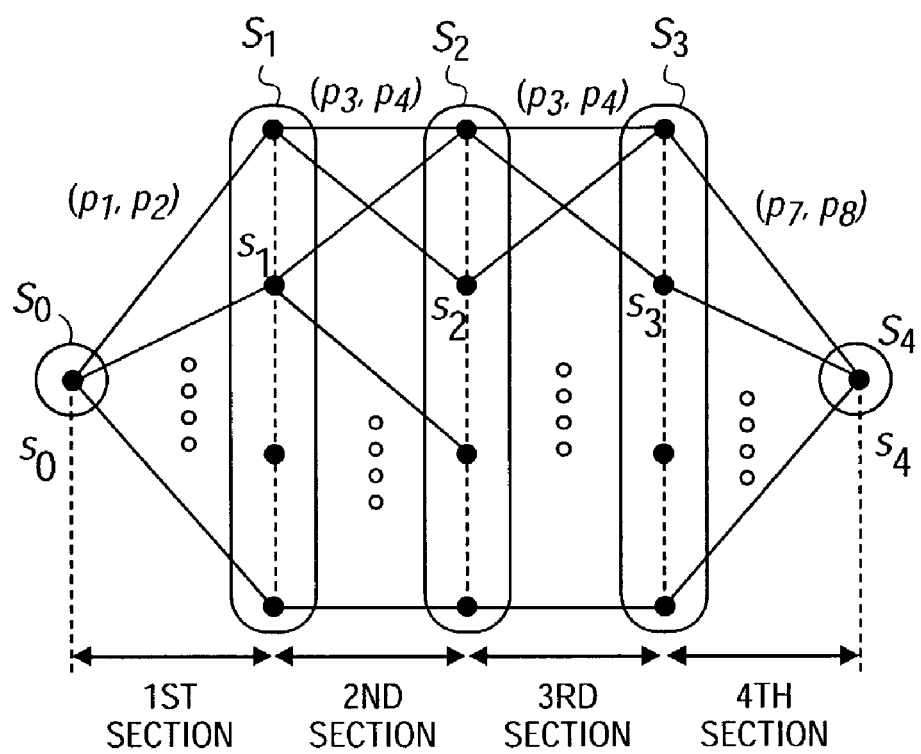
FIG. 3 illustrates one example trellis diagram for estimating block code.

To decode CCK codewords, the CCK estimator 220 uses the received CCK codeword symbol $y_k$ and a channel estimator value "h" from channel estimator 260 to eqlize the received symbols and calculate a branch metric using an example trellis diagram shown in FIG. 3. This trellis diagram represents an example trellis diagram for block code of any size. For example, the trellis diagram of FIG. 3 can represent a trellis diagram for decoding high-rate CCK modulated codewords. In other examples, the trellis diagram of FIG. 3 can recent the trellis and subtrellis diagrams described in the '080 co-pending application. For purposes explanation, the trellis diagram of FIG. 3 is a trellis diagram for a CCK codeword having a block size of 8 ("CCK diagram"). The branch metric is a measure of the distance between received symbols and symbols associated with the possible branch in the CCK diagram in which each branch represents symbol combinations for the CCK codeword including at least one symbol. Each branch begins at a first state and ends at a second state. As described in further detail below, a path metric for possible paths from branch to branch can be determined using the branch metric. The channel estimator value h indicates a channel impulse response and can be determined by the channel estimator 260, as described below.

The CCK estimator 220 uses the calculated branch metric to determine a path metric for a path in the CCK diagram. A path can be made between an initial state and a final state in the CCK diagram. The surviving path between the initial state and final state associated with the smallest path metric is used to determine the CCK codeword contained or embedded in a received signal. Referring to the CCK diagram of FIG. 3 for example, the path from the initial state $s_0$ to the final state $s_4$ having the smallest path metric is used for estimating a CCK codeword. As described in further detail below, the CCK estimator 220 can perform the metric calculation according to a decision feedback sequence estimation algorithm to account for inter-codeword and intra-codeword interference.

CCK Trellis Diagram

FIG. 3 illustrates one example CCK trellis diagram for estimating CCK codewords. As described in further detail below, by using a CCK diagram, a CCK estimator can estimate CCK codewords without having to find a match between a received CCK codeword with all possible combinations of CCK codewords. Thus, the CCK estimator disclosed herein improves efficiency for decoding CCK codewords.

The diagram represents a plurality branches between states for finding a path in the diagram. Each path between an initial state and a final state can represent a CCK codeword. Each branch can represent a symbol combination representing one or more symbols. For example, the path from the state $s_0$ to $s_1$ to $s_2$ to $s_3$ to $s_4$ represents one CCK codeword. In this manner, there can be a one-to-one mapping of a path in the trellis diagram to a possible CCK codeword. The equalization and branch metric calculation as described below can be used to determine a path metric to find a path in the CCK diagram.

Referring to FIG. 3, the diagram can contain (8/N) sections and each section can contain N symbols of the CCK codeword. As shown, the trellis diagram has four sections (section 1 to section 4) where N=2. In this example, each branch represents two CCK symbols between states. For example, the branch from state $s_0$ to state $s_1$ can be represented by two CCK symbols such as (1, 1), or (−1, −1). The branches and symbols can take any variations such that all possible CCK codewords can be represented by a path in the diagram.

The CCK symbols associated with each branch is referred to as a branch label and denoted by $(p_{2k-1}, p_{2k})$, k=1, 2, 3, 4 where $p_{2k-1}$ is transmitted first in time. The initial state $s_0$ is the left most state in the diagram. The final state $s_4$ is the right most state in the diagram. The set of all possible states $s_k$ for a given k is denoted by $S_k$. The size of a set A is denoted by |A|. Thus, the size for sets $S_0$ and $S_4$, $|S_0|$ and $|S_4|$, are both equal to one since there is only one initial state and final state. In the example diagram shown, the size of the sets for $S_1$, $S_2$, and $S_3$, $|S_1|$, $|S_2|$, and $|S_3|$, equal four. However, these sets can have varying sizes depending on the design of the CCK diagram used.

Branch Metric Calculation and Feedback Sequence Estimation Algorithm

The CCK estimator 220 can perform the following equation to calculate a branch metric $\mu$ of the bth branch emanating from the state $s_{k-1} \epsilon S_{k-1}$ in the kth section in the CCK diagram as shown, e.g., in FIG. 3. The following equation can also use a feedback sequence estimation algorithm to handle inter-codeword and intra-codeword interference:

$$\mu = \sum_{n=1}^{N} \mu_n$$

$$\mu_n = \left\| y_{(k-1)N+n} - \left( \sum_{m=(k-1)N+n}^{L} h_m^* \cdot \alpha_m + \sum_{m=n}^{(k-1)N+n-1} h_m^* \cdot \beta_m + \sum_{m=1}^{n-1} h_m^* \cdot \gamma_m + h_0^* \cdot p_{(k-1)N+n} \right) \right\|^2$$

where:
- N: represents the number of CCK symbols associated with each branch in the CCK trellis diagram (i.e., the number of symbols in a branch label);
- $\mu_n$: represents the metric of the bth branch emanating from the state $s_{k-1} \in S_{k-1}$ in the kth section at the nth calculation cycle (n∈{1, . . . , N}) in which $\mu_n$ will have different values for different values of b and $s_{k-1}$;
- $y_t$: represents the received complex-value symbol at time instant t, and, for one implementation, the time instant at the initial state of decoding a new codeword is denoted by 1 such that during decoding of each codeword the received symbol $y_1$ is at time instance 1, the received symbol $y_2$ is at time instance 2, and etc. until the received symbol $y_8$ is received at time instance 8;
- $\gamma_m$: {$\gamma_1$, . . . , $\gamma_{n-1}$} represents the past complex-value symbols of the branch label of the bth branch emanating from the state $s_{k-1}$ at the nth calculation cycle in which $\mu_n$ will have a different value for different values of b and $s_{k-1}$, and $\gamma_m$ has a null value during the first calculation cycle of each section, since at that time instance, there is no past symbol that comes from the current branch label;
- $\beta_m$: represents the complex-value CCK symbols corresponding to the surviving path for the state $s_{k-1}$—this surviving path for state $s_{k-1}$ is a path with a minimum path metric that starts from state $s_0$ and ends at state $s_{k-1}$ in which $\beta_m$ will have a different value for different values of $s_{k-1}$;
- $\alpha_m$: represents the complex-value symbols of the CCK codewords estimated by the CCK estimator;
- L+1: represents the length of coefficients of the estimated channel impulse response;
- h: represents the estimated discrete-time, complex-valued channel impulse response where h=($h_0$, $h_1$, . . . , $h_L$), $h_m = h_{m,r} + j \cdot h_{m,i}$ that can be calculated by the channel estimator 260; and wherein the above formula is implemented within a feedback sequence estimation algorithm as described in further detail below.

CCK Estimator

Figure 4:
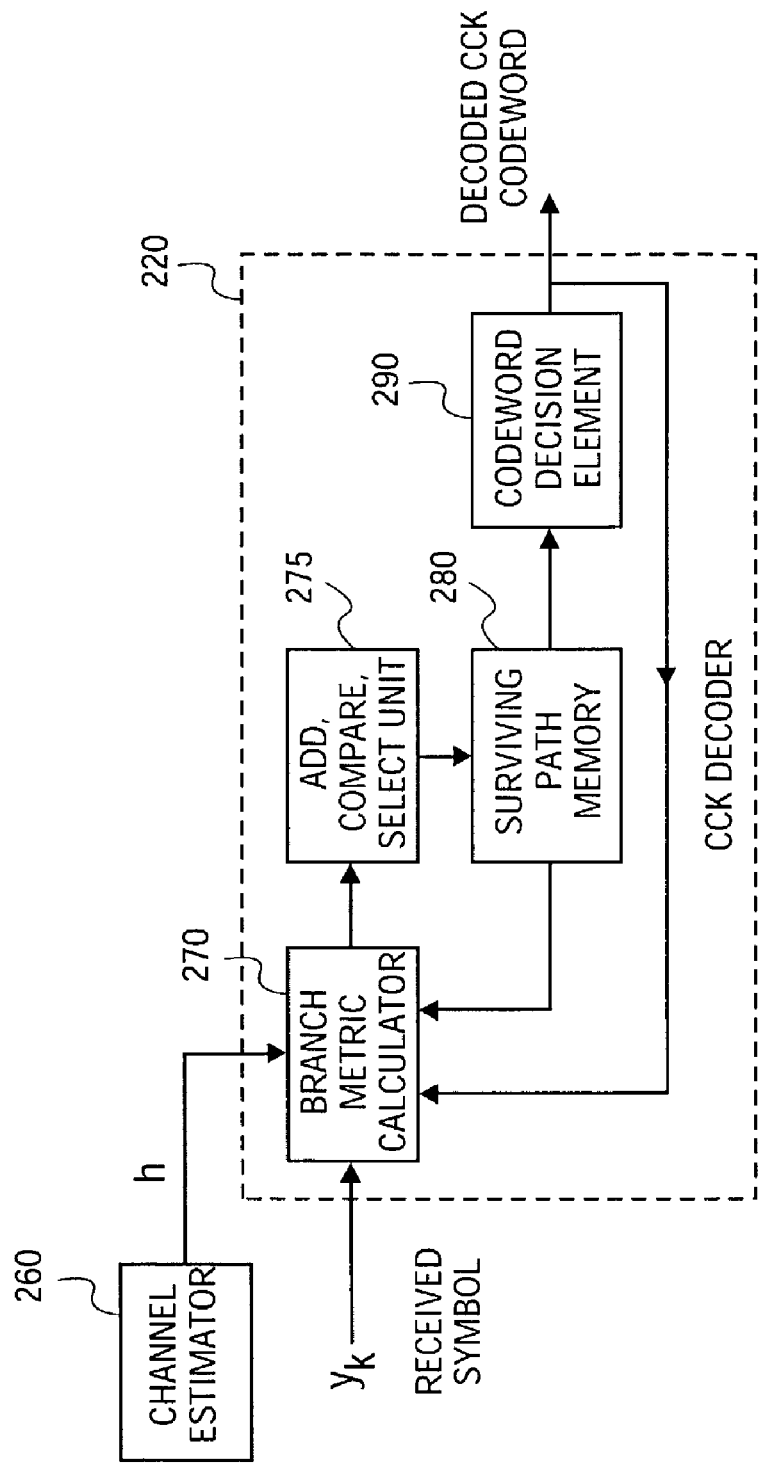
FIG. 4 illustrates one example detailed block diagram of the CCK estimator of FIG. 1.

FIG. 4 illustrates one example detailed block diagram of the CCK estimator 220 of FIG. 1. The CCK estimator 220 can use a CCK trellis diagram and an equalizatin and branch metric calculation according to a decision feedback sequence estimation algorithm, as described above, to estimate CCK codewords from a received signal. The CCK estimator 220 includes an equalizatin and branch metric calculation 270, add, compare, select unit 275, surviving path memory 280, and a codeword decision element 290.

Referring to FIG. 4, the equalizer and branch metric calculator 270 uses a number of reconstruction filters, which are $ISI_A$, $ISI_B$, and $ISI_C$ and received candidate estimators as described in further detail below regarding FIG. 5. These filters estimate the intersymbol interference (ISI) including inter-codeword and intra-codeword interference in a received signal. The filters assist in determining the branch metric for each section in the CCK trellis diagram that accounts for the ISI. The filters can estimate the ISI using a decision feedback estimation algorithm as described herein. Calculator 270 uses the channel impulse response h from channel estimator 260, received symbol $y_k$ from converter 230, the surviving path stored in the surviving path memory 280, and the previously decoded CCK codewords from codeword decision element 290 to calculate the path and branch metrics. For each calculation cycle with a symbol period of T, the CCK estimator 220 receives one received symbol $y_k$ and the codeword decision element 290 outputs one decoded CCK codeword, which can be a combination of 8 complex-value numbers at every 8 calculation cycles, i.e., at every 8 T.

In each kth section of the diagram, the add, compare, select unit 275 determines a path metric of each newly-formed path from state $s_0$ to state $s_k$ by adding the path metric of the surviving path for state $s_{k-1}$ and the branch metric from calculator 270 for the branch from state $s_{k-1}$ to state $s_k$. The unit 275 then compares the path metric for the newly-formed paths leading to the same state $s_k$, and selects the path with the smallest path metric as the surviving path for the state $s_k$. The surviving paths for each state $s_k \in S_k$ in the kth section are stored in surviving path memory 280 for computation in the next section. After the calculation of the last section, e.g., section 4 in the diagram of FIG. 3, the codeword decision element 290 identifies the surviving path left from state $s_0$ to state $s_4$. The codeword decision element 290 then chooses the symbols of the surviving path as the estimated CCK codeword. The estimated CCK codeword from the codeword decision element 290 can be fed into the branch metric calculator 270. Referring back to FIG. 2, the estimated CCK codeword can feed into the message sink 210.

The above components of CCK estimator 220 can be implemented in hardware such as, for example, an application specific integrated circuit (ASIC) or a field programmable gate array (FPGA) to perform the CCK codeword estimating techniques described herein. Alternatively, the above components can be implemented in software in which a digital signal processor (DSP) and one or more memory devices can be used to implement the CCK codeword estimating techniques described herein. Additionally, the CCK receiver 200 can be configured or programmed using a combination of hardware and software to implement the CCK estimating techniques described herein.

Equalizer and Branch Metric Calculator

Figure 5:
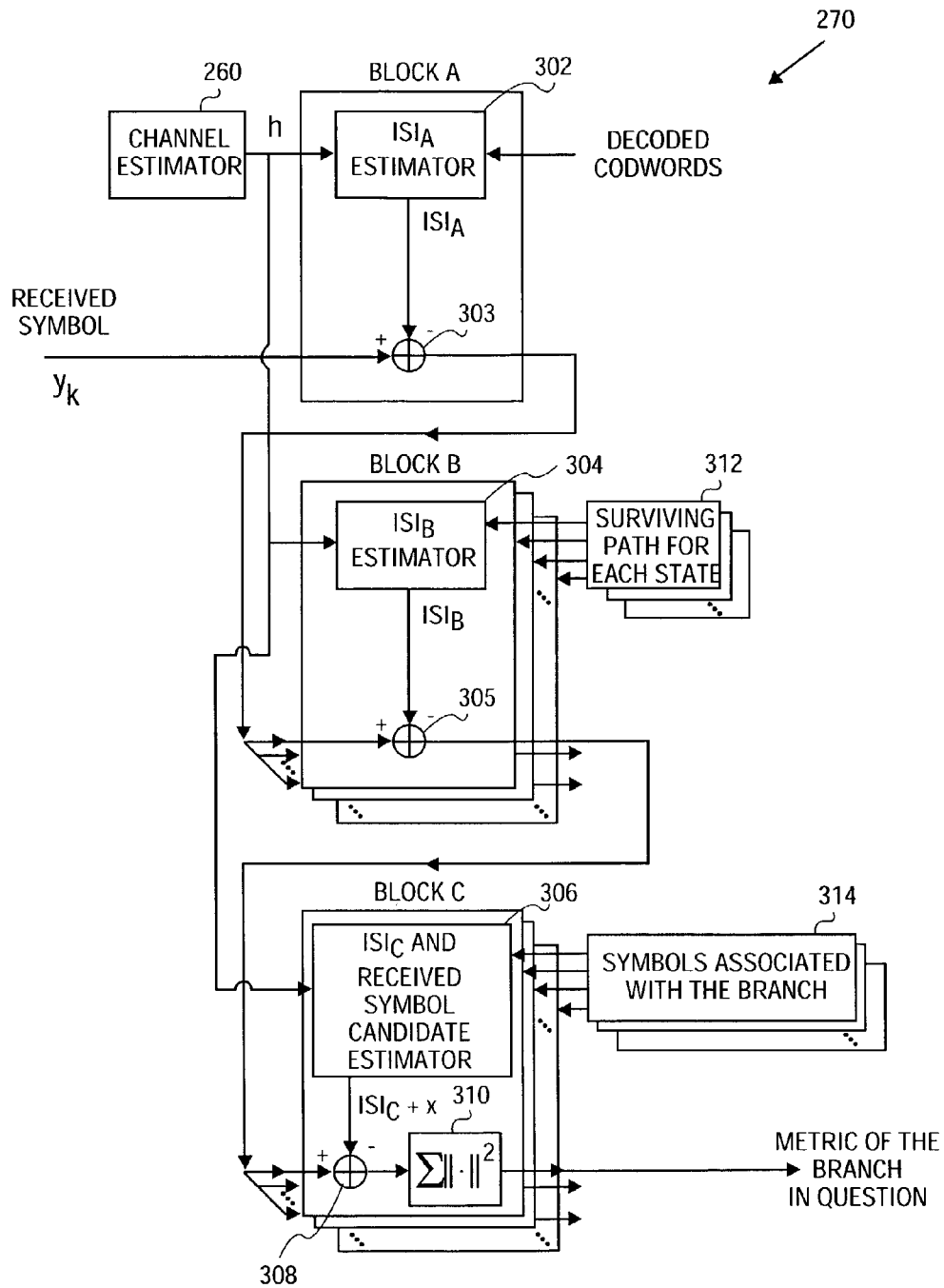
FIG. 5 illustrates one example detailed block diagram of the equalizer and branch metric calculator in the CCK estimator of FIG. 4.

FIG. 5 illustrates one example detailed block diagram of the equalizer and branch metric calculator 270 of FIG. 4. Equalizer and branch metric calculator 270 can calculate the metric of each branch in a given kth section of the diagram using the above metric calculation formula. The branch metric can provide a distance measurement, which can indicate how close symbols are associated with each other. In one example, the squared Euclidean distance between a received symbol and received symbol candidate plus the assumed ISI, which is derived according to a decision feedback estimation algorithm, can be used to derive the distance measurement. In another example, a MIN-MAX approximation can be used in place of the squared Euclidean distance measurement to determine a distance between a received symbol and received symbol candidate. In the MIN-MAX approximation, the following formula can be used:

$|a+bj|^2 \cong \max\{a, b\} + 0.5 \min\{a, b\}$, where a and b are real numbers and $j=\sqrt{-1}$.

This algorithm uses a number of filters or ISI estimators to estimate the intersymbol interference (ISI). The overall ISI estimators can be divided into three blocks. The first block (block A) is the ISI caused by the previously decoded codewords and is denoted by $ISI_A$. The second block (block B) is the tentative ISI caused by the symbols of a surviving path and is denoted by $ISI_B$. The third block (block C) is the tentative ISI caused by the symbols of a branch and is denoted by $ISI_C$.

Block A includes an $ISI_A$ estimator 302 that uses the previously estimated CCK codewords and the channel impulse response h to estimate $ISI_A$. Subtractor 303 subtracts the $ISI_A$ from the received symbol $y_k$. In this example, only a single block A is required. Block B includes an $ISI_B$ estimator 304 that uses the surviving path for each state 312 represented by $s_{k-1} \in S_{k-1}$ in a given kth section of the CCK diagram and the channel impulse response h to estimate $ISI_B$. Subtractor 305 further subtracts the $ISI_B$ from the output of the subtractor 303 in block A. A plurality of blocks for block B can be used as a result of the surviving paths being generally different for different states of $s_{k-1}$. In such a case, the number of blocks for block B can equal the number of $|S_{k-1}|$ in each section of the CCK diagram.

Block C includes an $ISI_C$ and received symbol candidate x estimator 306 that uses the symbols associated with the branch 314 for each branch from state $s_{k-1}$ to state $s_k$ in a given kth section and the channel impulse response h to estimate the $ISI_C$ and the received symbol candidate x. Subtractor 308 subtracts the $ISI_C$ and received symbol candidate x from the output of subtractor 305 of block B. The sum of the $ISI_A$, $ISI_B$, and $ISI_C$ are the overall ISI affecting the current received symbol $y_k$. In one example, processing block 310 calculates the squared Euclidean distance between the received symbol and the received symbol candidate x plus the overall ISI. The result of this calculation provides the branch metric of the branch in question. In other examples, a MIN-MAX calculated as described above can be used to calculate the branch metric. A plurality of blocks for block C can be used as a result the $ISI_C$ and the received symbol candidate x being generally different for different branches. In such a case, the number of blocks for block C can equal the number of branches in each section of the CCK diagram.

$ISI_A$ Estimator

Figure 6:
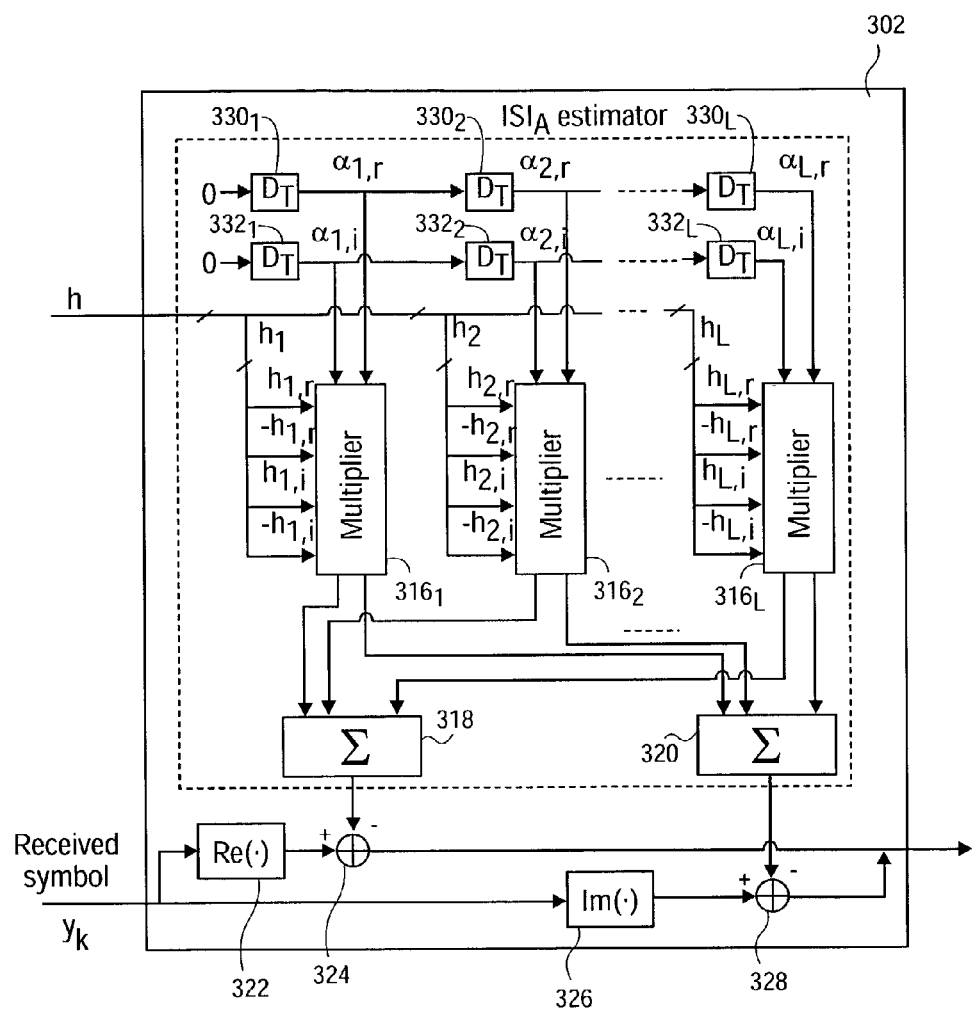
FIG. 6 illustrates one example detailed block diagram of an $ISI_A$ estimator in the equalizer and branch metric calculator of FIG. 5.

FIG. 6 illustrates one example detailed block diagram of an $ISI_A$ estimator 302 of FIG. 5. $ISI_A$ estimator 302 can act as a complex-numbered FIR filter with L delayed elements $\alpha_1, \ldots, \alpha_L$ and L filter coefficients $h_1, \ldots, h_L$ where L+1 is the length of the discrete-time channel impulse response h. $ISI_A$ estimator 302 includes a plurality of real part delay elements $D_T$ $330_1$ through $330_L$ and imaginary part delay elements $D_T$ $332_1$ through $332_L$. These delay elements have a delay T that is the symbol duration. The following equation can be used to determine the $ISI_A$ in each calculation cycle:

$$ISI_A = \sum_{m=1}^{L} h_m^* \cdot \alpha_m, \alpha_m \in \{0, \pm 1, \pm j\}.$$

The $\alpha_1$, L, $\alpha_L$, $h_1$, L, $h_L$ are complex values having real and imaginary parts. The filter coefficients $h_1$, L, $h_L$ are extracted from the channel impulse response $h=(h_0, h_1, L, h_L)$, which is supplied from the channel estimator 260. Initially, at time instance 1 when beginning to estimate a new CCK codeword, the previously estimated CCK codewords are loaded as $\{\alpha_m\}$. For example, the delay elements, at time instance 1, denoted by $(\alpha_1, L, \alpha_L)_1$, are set as follows:

$(\alpha_1, L, \alpha_L)_1 = (s_1, L, s_L)$ where $(s_1, L, s_8)$ is the most recently estimated codeword and $s_8$ is first in time. In addition, $(s_9, L, s_{16})$ is the second most recently estimated codeword and $s_{16}$ is first in time, and so on.

The delayed elements delay $\{\alpha_m\}$ such that they are shifted for each calculation cycle and updated as follows:

$(\alpha_1, \alpha_2, L, \alpha_L)_p = (0, \alpha_1, L, \alpha_{L-1})_{p-1}$, p=2, ..., 8 where the subscript p denotes the pth calculation cycle during decoding a codeword, or equivalently:

$(\alpha_{1,r}, \alpha_{2,r}, L, \alpha_{L,r})_p = (0, \alpha_{1,r}, L, \alpha_{L-1,r})_{p-1}$ $(\alpha_{1,i}, \alpha_{2,i}, L, \alpha_{L,i})_p = (0, \alpha_{1,i}, L, \alpha_{L-1,i})_{p-1}$ and the subscripts r and i denote the real and imaginary parts of the quantity, respectively.

The multipliers $316_1$ to $316_L$ perform the multiplication $h_m^* \cdot \alpha_m$. These multipliers are described in further detail below regarding FIG. 8. The real and imaginary parts of the output of these multipliers are summed by adders 318 and 320, respectively. The outputs of adders 318 and 320 are then subtracted from the real and imaginary parts of the received symbol $y_k$ by subtractors 324 and 328, respectively, that provides the estimated $ISI_A$.

Figure 7:
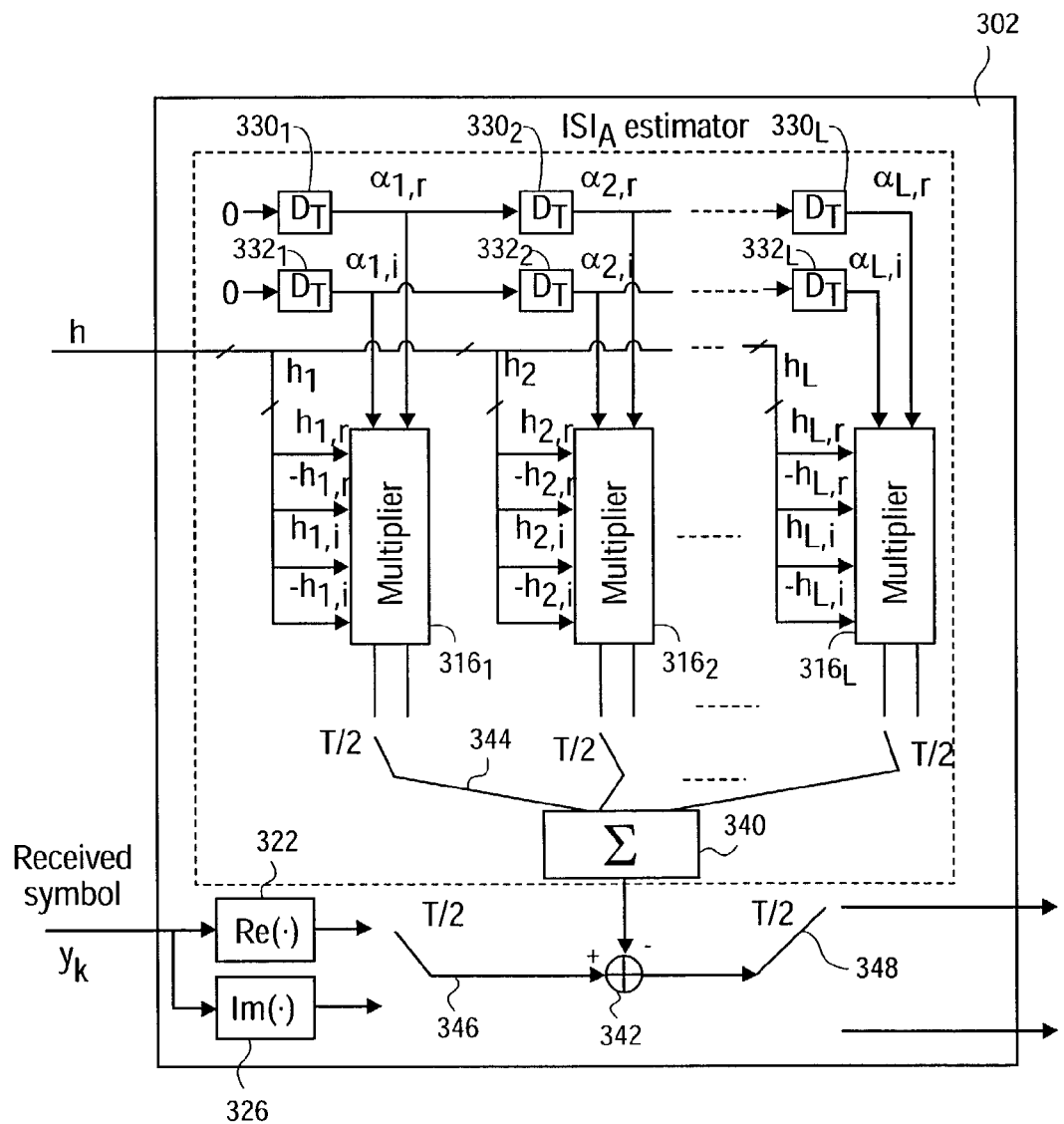
FIG. 7 illustrates another example detailed block diagram of and an $ISI_A$ estimator in the equalizer and branch metric calculator of FIG. 5.

FIG. 7 illustrates another example detailed block diagram of an $ISI_A$ estimator 302 in the equalizer and branch metric calculator of FIG. 5. In this example, the amount of circuitry for implementing the $ISI_A$ estimator can be reduced. Referring to FIG. 7, a switch 346 can be used to selectively receive the real and imaginary parts of the received symbol $y_k$ having a switching duration T/2, where T is the symbol duration. A switch 344 is used to selectively receive the real and imaginary parts of the outputs from multipliers $316_1$ to $316_L$. A switch 348 is also used at the output of the $ISI_A$ estimator 302 to selectively output the real and imaginary parts of the estimated $ISI_A$ output. The above switches can be synchronized to switch to the real or imaginary parts. Furthermore, by using the above switches, in this example only one adder 340 and subtractor 342 are needed to derive the estimated $ISI_A$ output thereby reducing the amount of circuitry needed.

Figure 8:
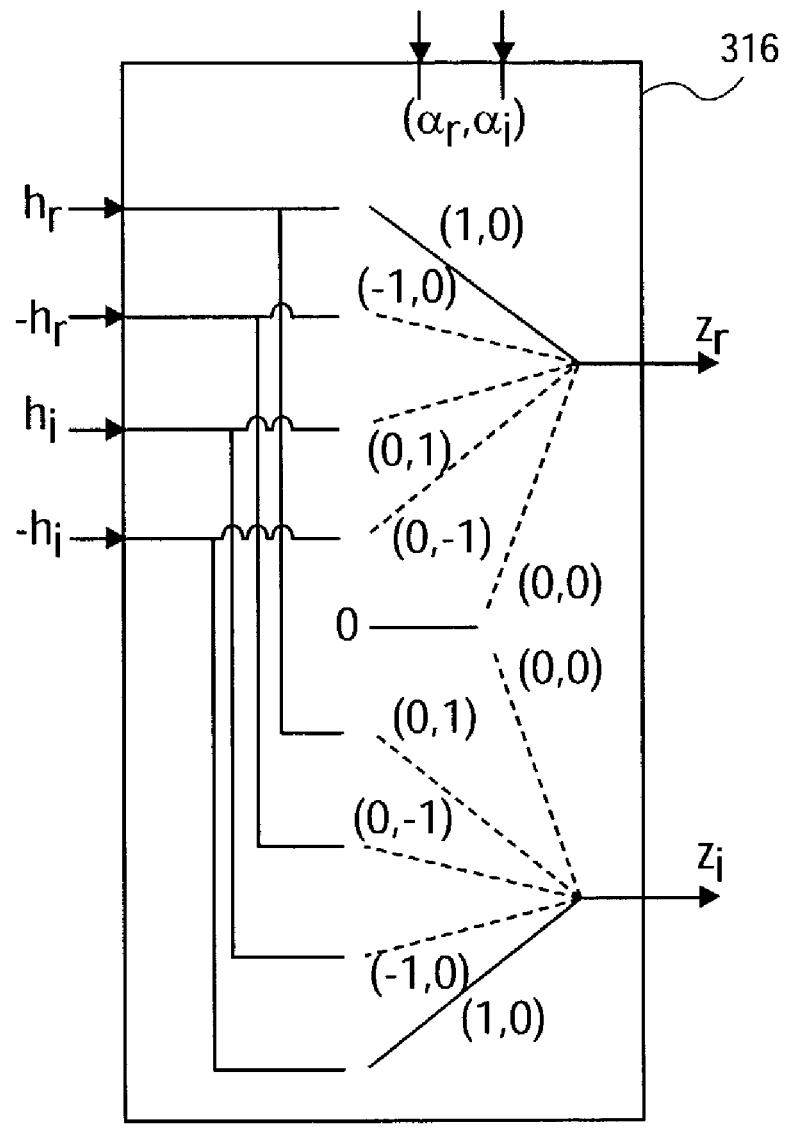
FIG. 8 illustrates one example detailed block diagram of a multiplier in the $ISI_A$ estimators of FIGS. 6 and 7.

FIG. 8 illustrates one example detailed block diagram of a multiplier 316 in the $ISI_A$ estimators of FIGS. 6 and 7. In addition, this type of multiplier can be used in the following implementations for the $ISI_B$ and $ISI_C$ estimators. This multiplier can perform a complex number multiplication such as $z=h^* \cdot \alpha$, where $z=z_r+jz_i$, $\alpha=\alpha_r+j\alpha_i$ and $h^*=h_r-jh_i$. Each symbol $\alpha$ in a CCK codeword can have the following values $\{+1, -1, +j, -j\}$. Thus, as shown in FIG. 8, the multiplication $z=h^* \cdot \alpha$ can be simplified as a simple selector circuit that outputs $Z_r$ and $Z_i$ according to the following rules in the Table 1 below.

TABLE 1

|  | $\alpha_r=1$<br>$\alpha_i=0$ | $\alpha_r=-1$<br>$\alpha_i=0$ | $\alpha_r=0$<br>$\alpha_i=1$ | $\alpha_r=0$<br>$\alpha_i=-1$ | $\alpha_r=0$<br>$\alpha_i=0$ |
|---|---|---|---|---|---|
| $z_r$ | $+h_r$ | $-h_r$ | $+h_i$ | $-h_i$ | 0 |
| $z_i$ | $-h_i$ | $+h_i$ | $+h_r$ | $-h_r$ | 0 |

$ISI_B$ Estimator

Figure 9:
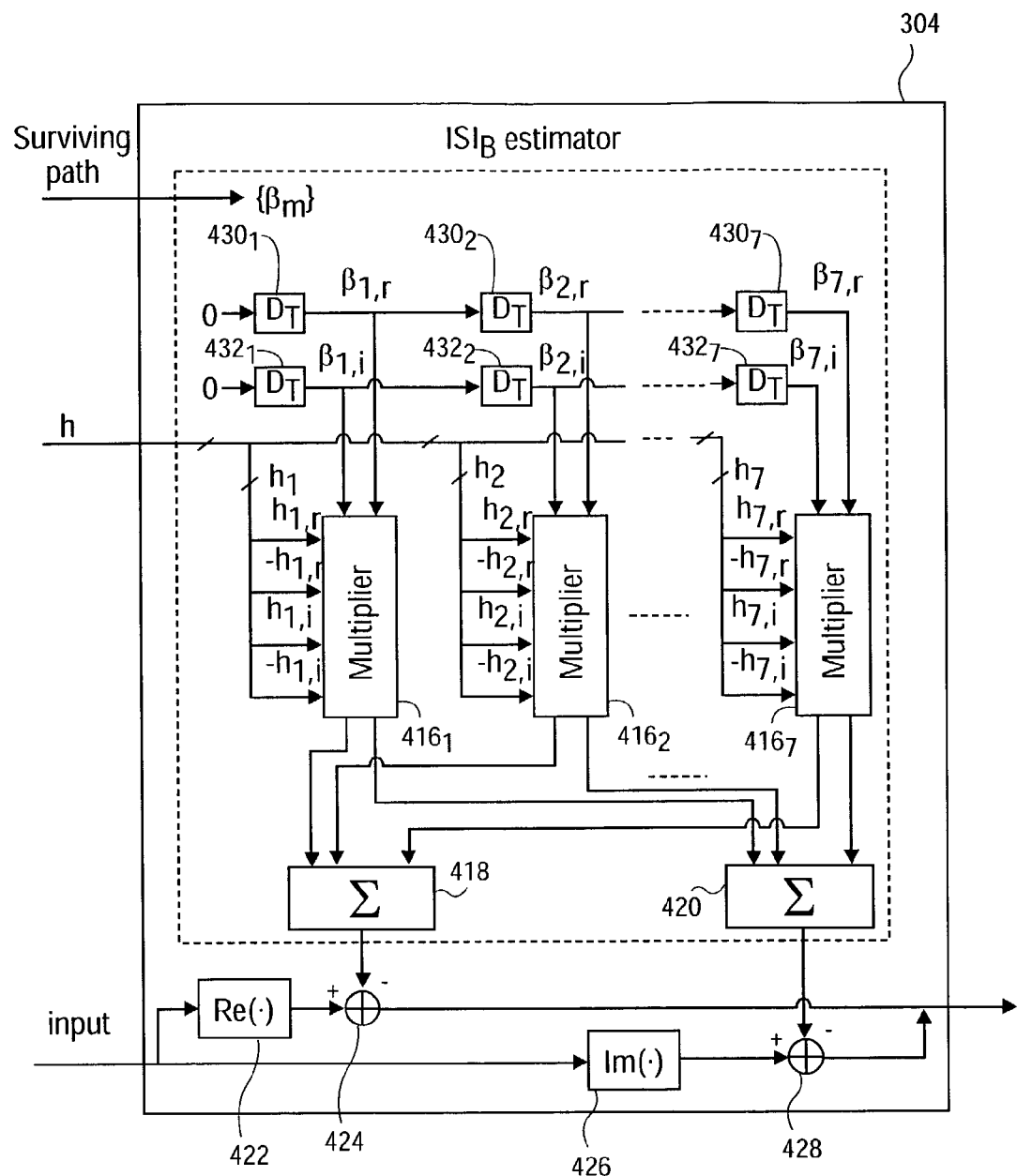
FIG. 9 illustrates one example detailed block diagram of an $ISI_B$ estimator in the equalizer and branch metric calculator of FIG. 5.

FIG. 9 illustrates one example detailed block diagram of an $ISI_B$ estimator 304 in the equalizer and branch metric calculator of FIG. 5. $ISI_B$ estimator 304 can act as a complex-numbered FIR filter with 7 delayed elements $\beta_1, L, \beta_7$ and 7 filter coefficients $h_1, L, h_7$. $ISI_B$ estimator 304 includes a plurality of real part delay elements $D_T$ $430_1$ to $430_7$ and imaginary part delay elements $D_T$ $432_1$ to $432_7$. These delay elements have a delay T, which is the symbol duration. The following equation can be used to determine the $ISI_B$ in each calculation cycle:

$$ISI_B = \sum_{m=1}^{7} h_m^* \cdot \beta_m, \beta_m \in \{0, \pm 1, \pm j\}.$$

The $\beta_1, \ldots, \beta_7, h_1, \ldots, h_7$ are all complex values having real and imaginary parts. The filter coefficients $h_1, \ldots, h_7$ are extracted from the channel impulse response $h=(h_0, h_1, \ldots, h_L)$, which is supplied from the channel estimator 260. The $\{\beta_m\}$ represent the surviving path for the state in question.

Initially, at the beginning of a new CCK codeword, the $\{\beta_m\}$ are all set to zero because the surviving path is null for the state $s_0$. For a given kth section of the diagram being used, the delay elements $\{\beta_m\}$ at the first calculation cycle during the section in question and are denoted as $(\beta_1, \ldots, \beta_7)_1$, and are set as follows:

$(\beta_1, \ldots, \beta_7)_1 = (d_{(k-1)N}, d_{(k-1)N-1}, \ldots, d_1, 0, \ldots, 0).$ The $(d_1, d_2, \ldots, d_{(k-1)N})$ denote the symbols on the surviving path for the state $s_{k-1}$ and $d_1$ is first in time, and N denotes the number of symbols associated with each section of the trellis diagram. For pth calculation cycle during the kth section, the delay elements delay $\{\beta_m\}$ and are denoted as $(\beta_1, \ldots, \beta_7)_p$, and are shifted and updated as follows:

$(\beta_1, \beta_2, \ldots, \beta_7)_p = (0, \beta_1, \ldots, \beta_6)_{p-1}, p=2, \ldots, N$ or equivalently $(\beta_{1,r}, \beta_{2,r}, \ldots, \beta_{7,r})_p = (0, \beta_{1,r}, \ldots, \beta_{6,r})_{p-1}$ $(\beta_{1,i}, \beta_{2,i}, \ldots, \beta_{7,i})_p = (0, \beta_{1,i}, \ldots, \beta_{6,i})_{p-1}$ where the subscripts r and i are used to denote the real and imaginary parts of the quantity, respectively. The multipliers $416_1$ to $416_7$ perform the multiplication $h_m^* \cdot \beta_m$. The real and imaginary parts of each multiplier are summed by adders 418 and 420, respectively. The outputs of these two adders are then subtracted from the real and imaginary parts of the input to the $ISI_B$ estimator 304 by subtractors 424 and 428, respectively, to provide the estimated $ISI_B$ output.

Figure 10:
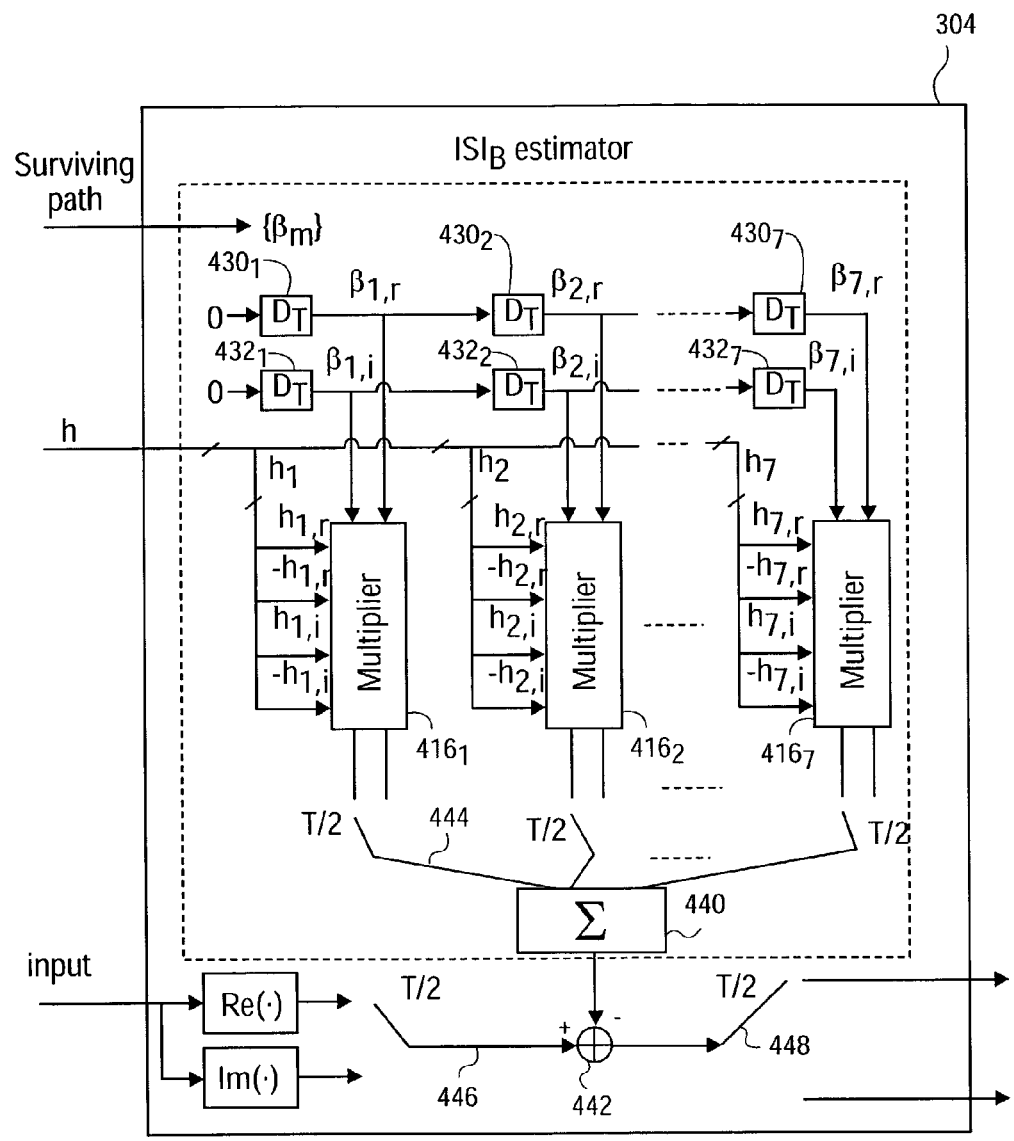
FIG. 10 illustrates another example detailed block diagram of an $ISI_B$ estimator in the equalizer and branch metric calculator of FIG. 5.

FIG. 10 illustrates another example detailed block diagram of an $ISI_B$ estimator 304 in the equalizer and branch metric calculator of FIG. 5. In this example, the amount of circuitry for implementing the $ISI_B$ estimator can be reduced. Referring to FIG. 10, a switch 446 is used to selectively receive the real and imaginary part of the estimated $ISI_A$ output having a switching duration T/2. A switch 444 is used to selectively receive the real and imaginary parts of the output from each of the multipliers $416_1$ to $416_7$. A switch 448 is also used at the output of the $ISI_B$ estimator 404 to selectively output the real and imaginary parts of the estimated $ISI_B$ output. The above switches can be synchronized to switch to the real and imaginary parts. Furthermore, by using the above switches, in this example only one adder 440 and subtractor 442 are needed to calculate the output value thereby reducing the amount of circuitry needed.

$ISI_C$ and Received Symbol Candidate Estimator

Figure 11:
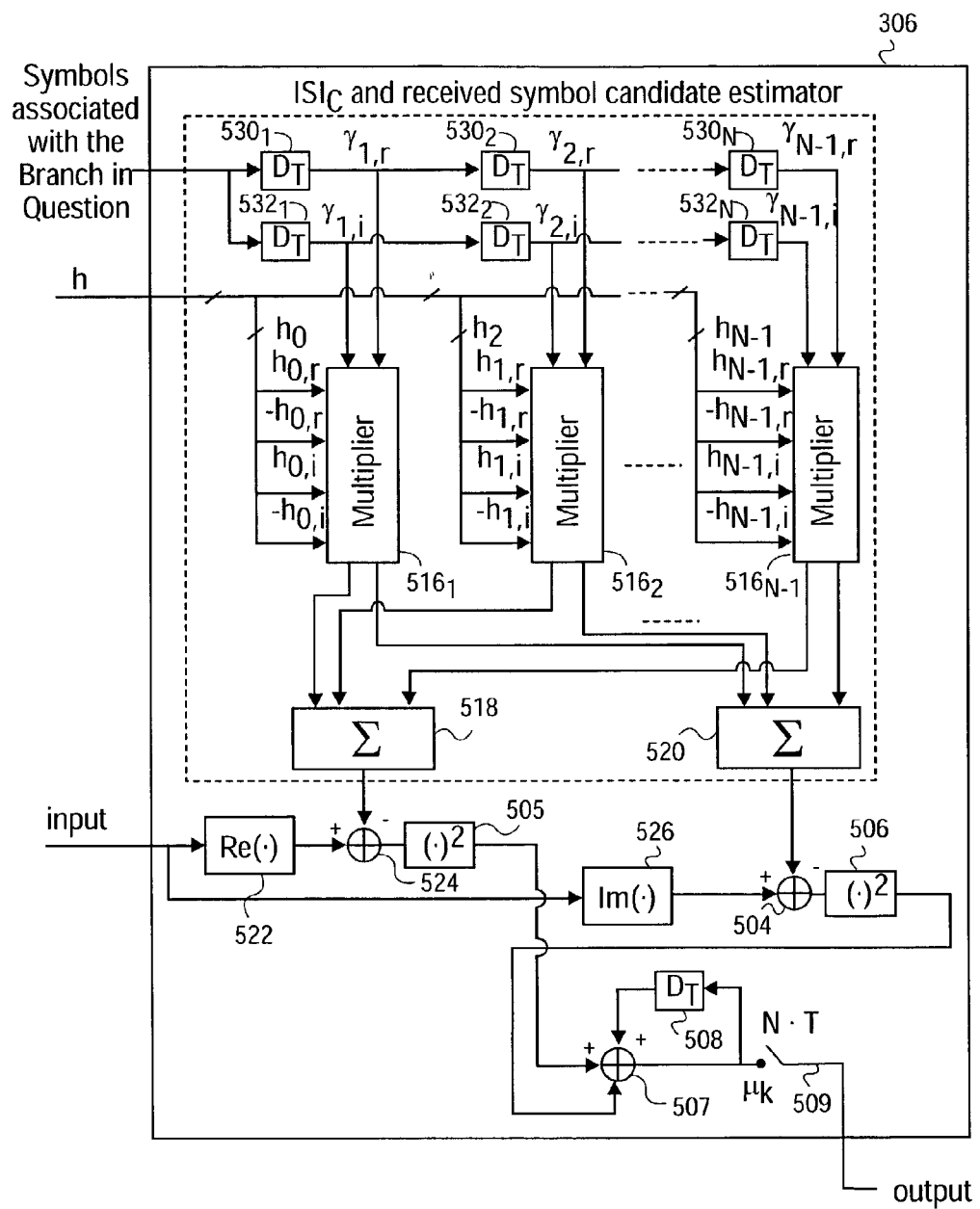
FIG. 11 illustrates one example detailed block diagram of an $ISI_C$ and received symbol candidate estimator in the equalizer and branch metric calculator of FIG. 5.

FIG. 11 illustrates one example detailed block diagram of an $ISI_C$ and received symbol candidate x estimator 306 in the branch metric calculator of FIG. 5. $ISI_C$ and received symbol candidate x estimator 306 can act as a complex-number FIR filter with N delay elements $\gamma_0, \ldots, \gamma_{N-1}$ and N filter coefficients $h_0, \ldots, h_{N-1}$, where N is the number of symbols in the branch label. $ISI_C$ and received symbol candidate x estimator 306 includes a plurality of real part delay elements $D_T$ $530_1$ to $530_N$ and imaginary part delay elements $D_T$ $532_1$ to $532_N$. These delay elements have a delay T. The following equation can be used to determine the $ISI_C$ in each calculation cycle:

$$ISI_C = \sum_{m=1}^{N-1} h_m^* \cdot \gamma_m, \gamma_m \in \{0, \pm 1, \pm j\}$$

and the received symbol candidate x is estimated as follows:

$x = h_0^* \cdot \gamma_0$ and the result is as follows:

$$ISI_C + x = \sum_{m=0}^{N-1} h_m^* \cdot \gamma_m, \gamma_m \in \{0, \pm 1, \pm j\}$$

The $\gamma_0, \ldots, \gamma_{N-1}, h_0, \ldots, h_{N-1}$ are complex values. The filter coefficients $h_0, \ldots, h_{N-1}$ are extracted from the channel impulse response $h=(h_0, h_1, \ldots, h_L)$, which is supplied from the channel estimator 260. The $(p_{kN-N+1}, \ldots, p_{kN-1}, p_{kN})$ can denote the branch label of the branch from state $s_{k-1}$ to state $s_k$ in a given kth section, and $p_{kn-N+1}$ is first in time. The $\{\gamma_m\}$ for the first calculation cycle during a given kth section of the trellis diagram is denoted by $(\gamma_0, \gamma_1, \ldots, \gamma_{N-1})_1$, and are set as follows:

$(\gamma_0, \gamma_1, \ldots, \gamma_{N-1})_1 = (p_{kN-N+1}, 0, \ldots, 0)$

For the pth calculation cycle during the kth section, the delay elements $\{\gamma_m\}$ are shifted and updated as follows:

$(\gamma_0, \gamma_1, \ldots, \gamma_{N-1})_p = (p_{kN-N+p}, \gamma_0, \ldots, \gamma_{N-1})_{p-1}, \; p=2, \ldots, N-1$ or equivalently $(\gamma_{0,r}, \gamma_{1,r}, \ldots, \gamma_{N-1,r})_p = (p_{kN-N+p,r}, \gamma_{0,r}, \ldots, \gamma_{N-1,r})_{p-1}$ $(\gamma_{0,i}, \gamma_{1,i}, \ldots, \gamma_{N-1,i})_p = (p_{kN-N+p,i}, \gamma_{0,i}, \ldots, \gamma_{N-1,i})_{p-1}$ where the subscripts r and i are used to denote the real and imaginary parts of the quantity, respectively.

The multipliers $516_1$ to $516_{N-1}$ perform the multiplication $h_m^* \cdot \gamma_m$. The real and imaginary parts of these multipliers are summed by adders 518 and 520, respectively. Subtractors 524 and 504 subtract the output of these multipliers from the real part and imaginary part, respectively, of the input to block C. Processing blocks 505 and 506 square the output from the subtractors 524 and 504, respectively. Adder 507 adds the previous output from adder 507 through a delay element $D_T$ 508 to the summed outputs of the processing blocks 505 and 506. Adder 507 is initially set to zero for each section. Thus, block C can output the metrics of each branch every N·T, where N is the number symbols in a branch label and T is the symbol duration.

Figure 12:
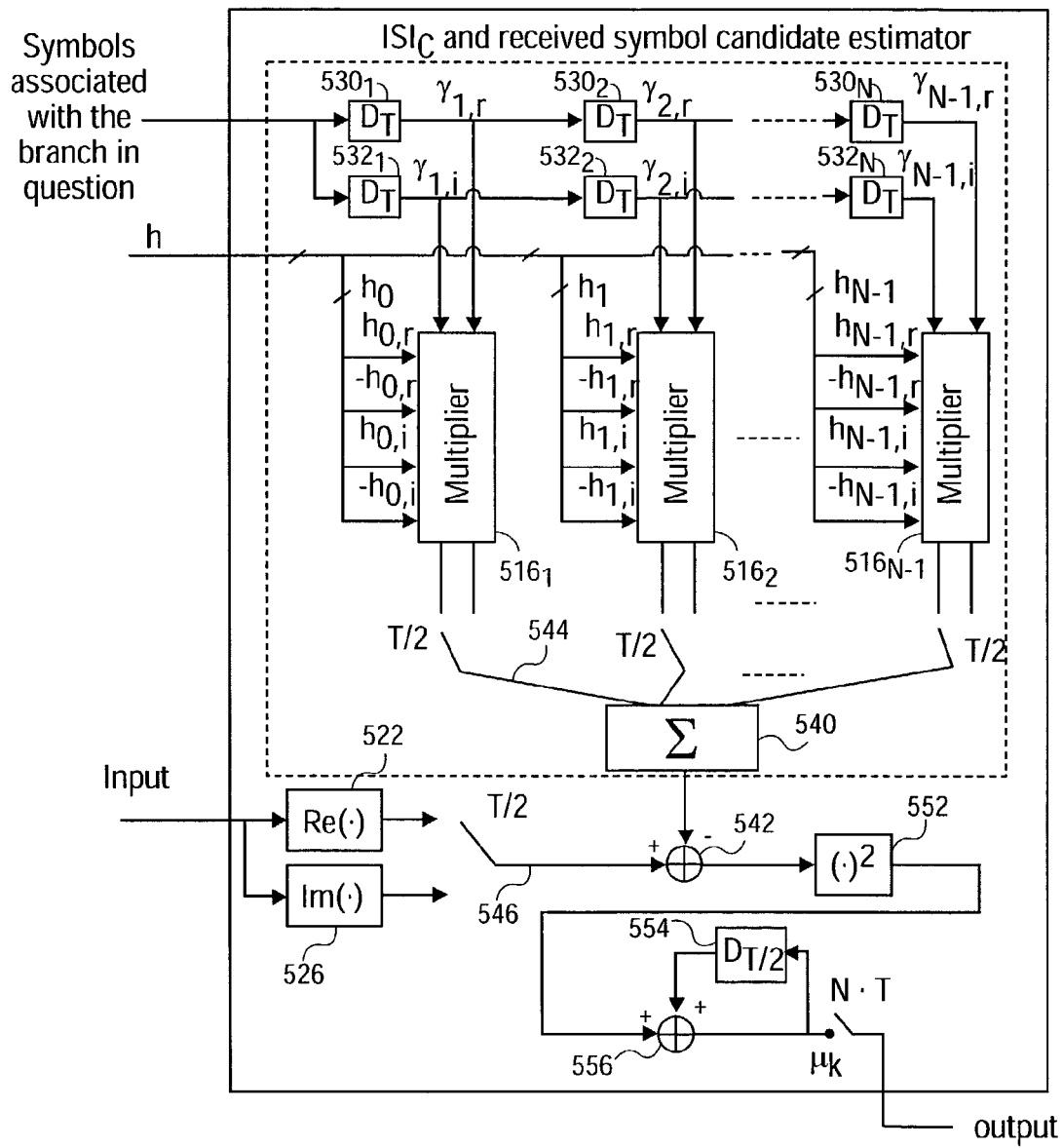
FIG. 12 illustrates another example detailed block diagram of and an $ISI_C$ and received symbol candidate estimator in the equalizer and branch metric calculator of FIG. 5.

FIG. 12 illustrates another example detailed block diagram of and an $ISI_C$ and received symbol candidate x estimator 306 in the equalizer and branch metric calculator of FIG. 5. In this example, the amount of circuitry for implementing the $ISI_C$ and received symbol candidate x estimator can be reduced. A switch 546 is used to selectively receive the real and imaginary parts 522 and 526 of the input having a switching duration T/2. A switch 544 is used to selectively receive the real and imaginary parts of the output from multipliers $516_1$ to $516_{N-1}$. These switches can be synchronized to obtain the real and imaginary parts. The adder 540 adds the outputs from the multipliers $516_1$ to $516_{N-1}$. Subtractor 542 subtracts the output from adder 540 from the real or imaginary parts of the input. Processing block 552 squares the output from subtractor 542. Adder 556 adds the previous output from adder 556 through a delay element $D_{T/2}$ 554 to the output of processing block 552. A switch 558 can selectively output the metrics of each branch every N·T. Furthermore, by using the above switches, in this example only two adders 540 and 556 and one subtractor 542 are needed to calculate the output thereby reducing the amount of circuitry needed.

Alternative Equalizer and Metric Calculator

FIGS. 13, 14A–14B, 15A–15B, and 16A–16B illustrate an alternative example of an equalizer and metric calculator for the CCK estimator of FIG. 5. This example is also for the case of N=2 regarding the diagram of FIG. 3. This example can also be applied to the general case of N greater than and equal to 2. In contrast to the above examples, the alternative example handles a received signal $y_t$ in parallel whereas the above examples handles a received signal sequentially. Although the amount of circuitry is increased in the alternative example, the calculation time decreases thereby providing a faster CCK estimator. In the case of N=2, the alternative example handles two received signals simultaneously to calculate the branch metrics.

Figure 13:
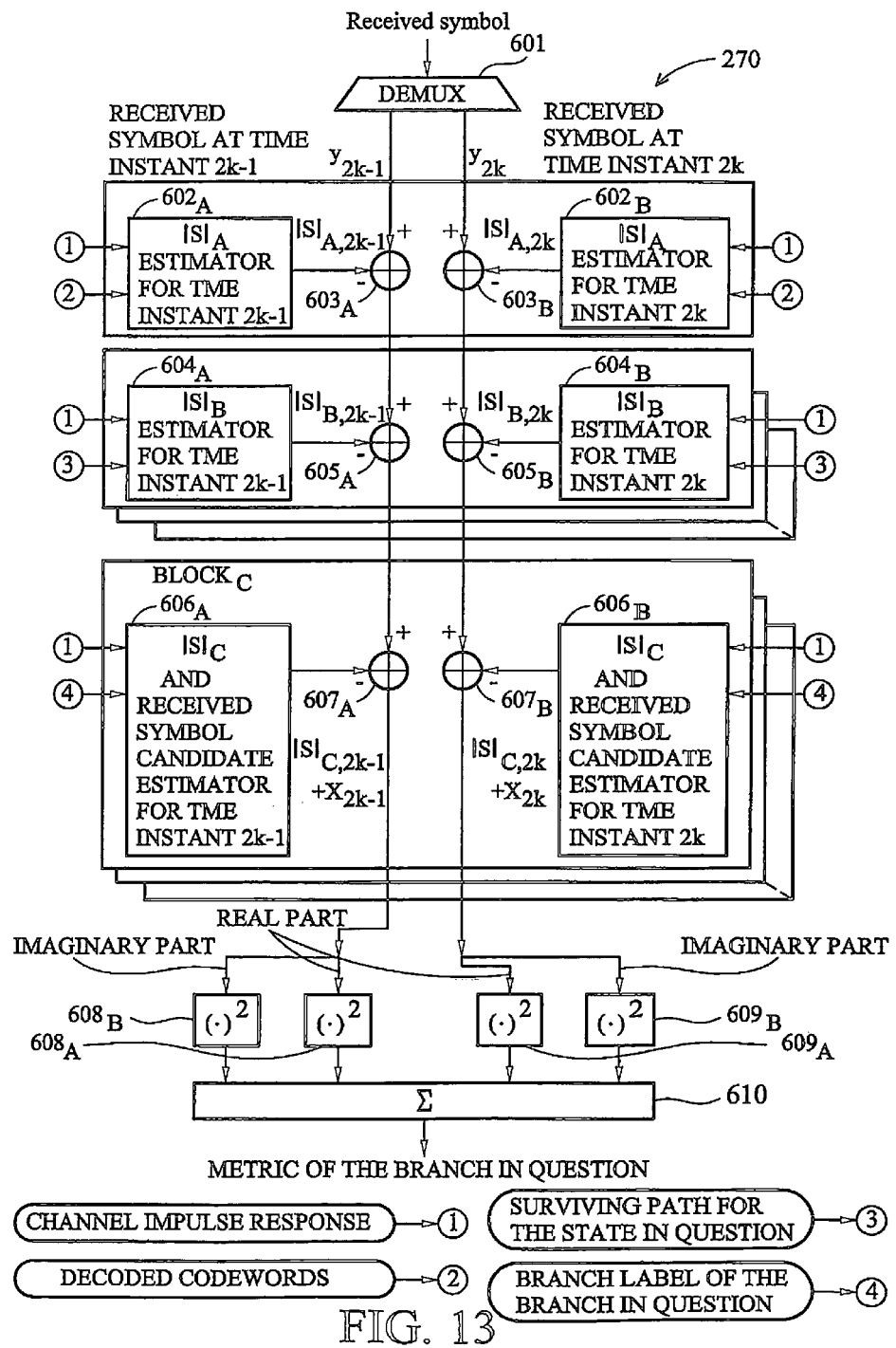
FIG. 13 illustrates an alternative block diagram of an equalizer and branch metric calculator for the CCK estimator of FIG. 5.

Referring to FIG. 13, equalizer and metric calculator 270 includes a demultiplexer ("demux") 601 that receives a received symbol and outputs two symbols every two symbol durations at time instant 2k−1 and 2k. For example, for the received symbols $y_1, y_2, y_3, y_4, \ldots$, where the subscript denotes the discrete-time instant, the demux 601 outputs $\{y_1, y_2\}$ at time instant 2, $\{y_3, y_4\}$ at time instant 4, and in general $\{y_{2k-1}, y_{2k}\}$ at time instant 2k. The $\{y_1, y_2\}$ is then used to calculate the metric of each branch in the first section of the CCK diagram. Furthermore, the $\{y_{2k-1}, y_{2k}\}$ is then used to calculate the metric of each branch from state $s_{k-1}$ to state $s_k$ in the kth section of the CCK diagram.

Equalizer and metric calculator 270 also includes blocks A, B, and C to handle ISI including $ISI_A$, $ISI_B$ and $ISI_C$, as well as the received symbol candidate x, which are subtracted from the received sumbols. Block A includes $ISI_A$ estimators $602_A$ and $602_B$. Based on the received symbols $\{y_{2k-1}, y_{2k}\}$ and the estimated channel impulse response h (represented in FIG. 13 by a "1" in a circle) from the channel estimator 260 and decoded codewords (represented in FIG. 13 by a "2" in a circle), $ISI_A$ estimators $602_A$ and $602_B$ estimate the $ISI_A$ at time instances 2k−1 and 2k, respectively, in the same manner as the $ISI_A$ estimators described above. Subtractors $603_A$ and $603_B$ subtract the output from $ISI_A$ estimators $602_A$ and $602_B$, respectively, from the received symbol at time instant $y_{2k-1}$ and at time instant $y_{2k}$, respectively. The output of subtractors $603_A$ and $603_B$ are fed into block B.

Block B includes $ISI_B$ estimators $604_A$ and $604_B$. At block B, based on the surviving path for the state $s_{k-1}$ (represented in FIG. 13 by a "3" in a circle) and the estimated channel impulse response h, $ISI_B$ estimators $604_A$ and $604_B$ estimate the $ISI_B$ at time instances 2k−1 and 2k, respectively, in the same manner as the $ISI_B$ estimator described above. Subtractors $605_A$ and $605_B$ subtract these $ISI_B$ values from the output of the subtractors $603_A$ and $603_B$ from block A. The output of subtractors $605_A$ and $605_B$ are fed into block C.

Block C includes $ISI_C$ and received symbol candidate x estimators $606_A$ and $606_B$. At block C, based on the branch label of the branch in question (represented in FIG. 13 by a "4" in a circle) and the estimated channel impulse response h, the $ISI_C$ and received symbol candidate x estimator $606_B$ estimates the $ISI_C$ and received symbol candidate x at time instance 2k. Based on the branch label of the branch in question, the $ISI_C$ and received symbol candidate x estimator $606_A$ estimates the $ISI_C$ and the received symbol candidate x at time instance 2k−1. The received symbol candidates for time instant 2k−1 and 2k are just the first symbol and the second symbol of the branch label, respectively. Subtractors $607_A$ and $607_B$ subtract the $ISI_C$ and the received symbol candidates from respective $ISI_C$ and received symbol candidate x estimators $606_A$ and $606_B$ from the output of the subtractors $605_A$ and $605_B$ in block B. The output of subtractors $607_A$ and $607_B$ are fed into processing blocks $608_A$ and $608_B$ and $609_A$ and $609_B$, respectively, that square the real and imaginary parts of the output values. The adder 610 sums the outputs of these processing blocks and its output provides the metric of the branch in question.

In the alternative example equalizer and metric calculator of FIG. 13, block A is independent of the branch in question. In this case, only one block A is needed. Block B requires the information of the surviving path for the state $s_{k-1} \in S_{k-1}$ for k=2, 3, 4. In such a case, the number of block B equals the number of $|S_{k-1}|$. In addition, block C needs the information of the branch label of the branch in question. Thus, in the case of 4 branches leading to state $s_k$, $4*|S_k|$ block C should be used.

Figure 14A:
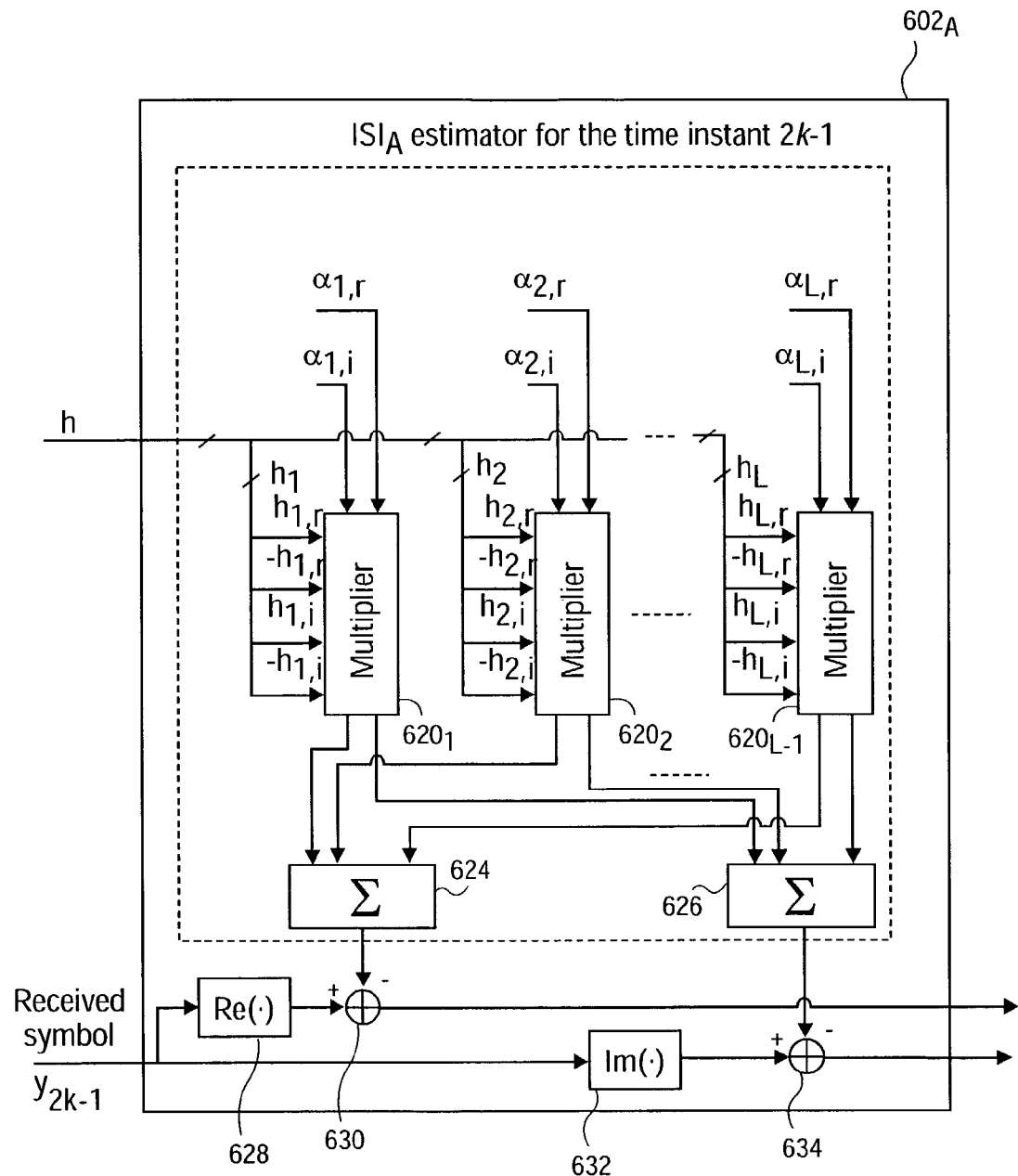
FIGS. 14A and 14B illustrate one example of detailed block diagrams of $ISI_A$ estimators at time instances $2k-1$ and $2k$, respectively, in the equalizer and branch metric calculator of FIG. 13.
Figure 14B:
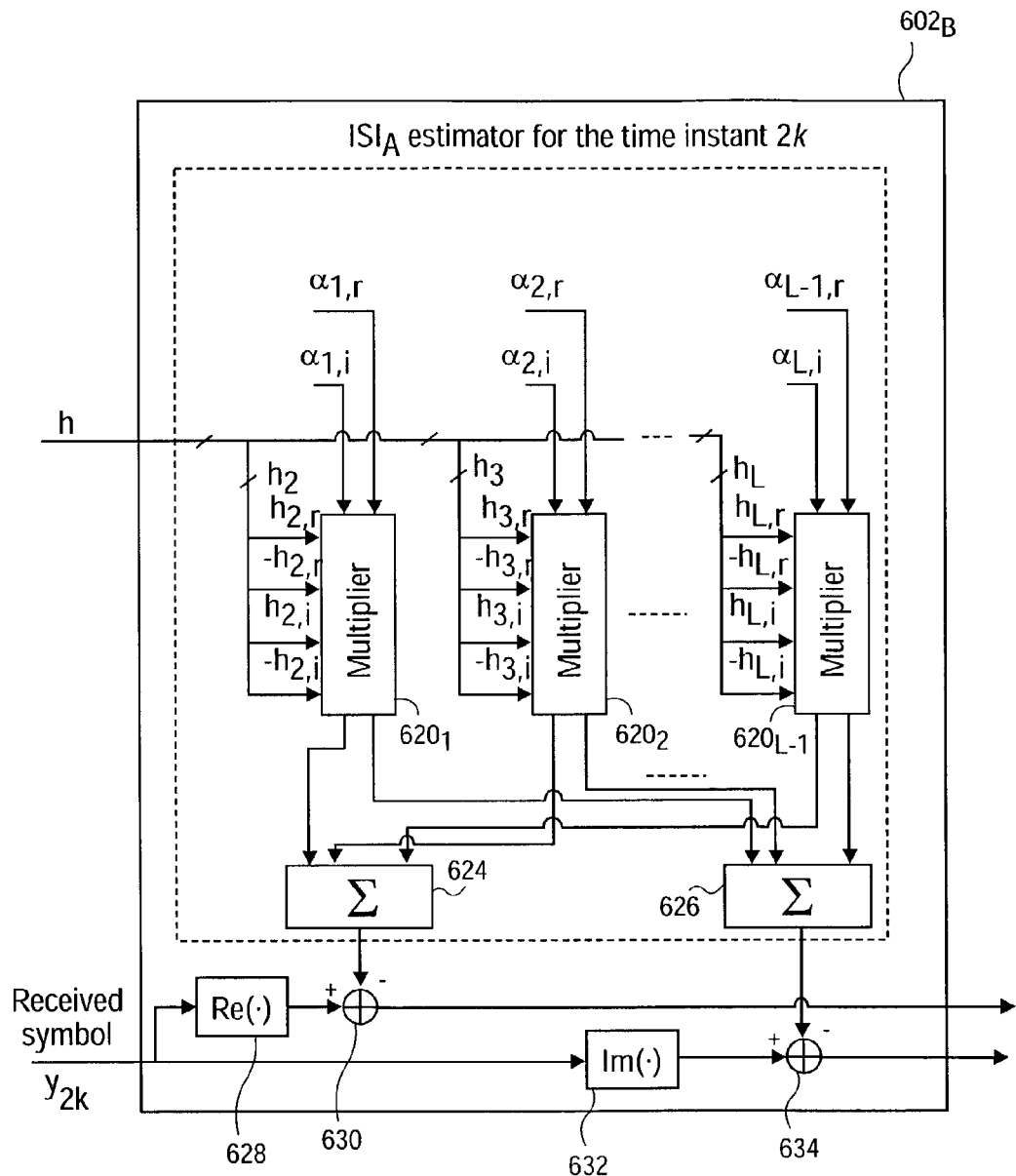

FIGS. 14A and 14B illustrate one example of detailed block diagrams of $ISI_A$ estimators $602_A$ and $602_B$ for time instances at 2k-1 and 2k, respectively, equalizer and metric calculator of FIG. 13.

Referring to FIG. 14A, $ISI_A$ estimator $602_A$ can be a complex-number FIR filter with L elements $\alpha_1$, L, $\alpha_L$ and L filter coefficients $h_1$, L, $h_L$, where L+1 is the length of the discrete-time channel impulse response. The following equation can be used to determine the $ISI_A$ occurring at time instant 2k-1 (denoted by $ISI_{A,2k-1}$):

$$ISI_{A,2k-1} = \sum_{m=1}^{L} h_m^* \cdot \alpha_m, \; \alpha_m \in \{0, \pm 1, \pm j\}$$

The $\alpha_1$, L, $\alpha_L$, $h_1$, L, $h_L$ are all complex values having real and imaginary parts. The filter coefficients $h_1$, L, $h_L$ are extracted from the channel impulse response h=($h_0$, $h_1$, L, $h_L$), which is supplied from the channel estimator 260. Initially, at section 1 of the CCK diagram, the previously estimated CCK codewords are loaded as $\{\alpha_m\}$. For example, the delay elements denoted by $(\alpha_1, L, \alpha_L)_1$, are set as follows:

$(\alpha_1, L, \alpha_L)_1 = (s_1, L, s_L)$ where $(s_1, L, s_8)$ is the most recently estimated codeword and $s_8$ is first in time, $(s_9, L, s_{16})$ is the second most recently estimated codeword and $s_{16}$ is first in time, and so on.

The elements $\{\alpha_m\}$ for the kth section are set to be, denoted by $(\alpha_1, \ldots, \alpha_L)_k$, are shifted and updated by $(\alpha_1, \alpha_2, \ldots, \alpha_L)_k = (0, 0, \alpha_1, \ldots, \alpha_{L-2})_{k-1}$, k=2,3,4 or equivalently $(\alpha_{1,r}, \alpha_{2,r}, \ldots, \alpha_{L,r})_k = (0, 0, \alpha_{1,r}, \ldots, \alpha_{L-2,r})_{k-1}$ $(\alpha_{1,i}, \alpha_{2,i}, \ldots, \alpha_{L,i})_k = (0, 0, \alpha_{1,i}, \ldots, \alpha_{L-2,i})_{k-1}$ where the subscripts r and i are used to denote the real part and imaginary part of the quantity, respectively.

The multipliers $620_1$ to $620_L$ perform the multiplication $h_m^* \cdot \alpha_m$. These multipliers can be same described in FIG. 8. The real and imaginary parts of the output of these multipliers are summed by adders 624 and 626, respectively. The outputs of adders 624 and 626 are then subtracted from the real and imaginary parts 628 and 632 of the received symbol $y_{2k-1}$ by subtractors 630 and 634, respectively. The output of subtractors 630 and 634 are fed into block B.

Referring to FIG. 14B, the $ISI_A$ estimator 602B at the time instance 2k can also be a complex-number FIR filter with L-1 elements $\alpha_1, \ldots, \alpha_{L-1}$ and L-1 filter coefficients $h_2, \ldots, h_L$. The following equation can be used to determine $ISI_A$ at time instance 2k(denoted by $ISI_{A,2k}$):

$$ISI_{A,2k} = \sum_{m=1}^{L-1} h_{m+1}^* \cdot \alpha_m, \; \alpha_m \in \{0, \pm 1, \pm j\}$$

where $(\alpha_1, \ldots, \alpha_{L-1})$ are the same as those in FIG. 14A. The multipliers $620_1$ to $620_{L-1}$, adders 624 and 626, and subtractors 630 and 634 operate in the same manner as in FIG. 14A.

Figure 15A:
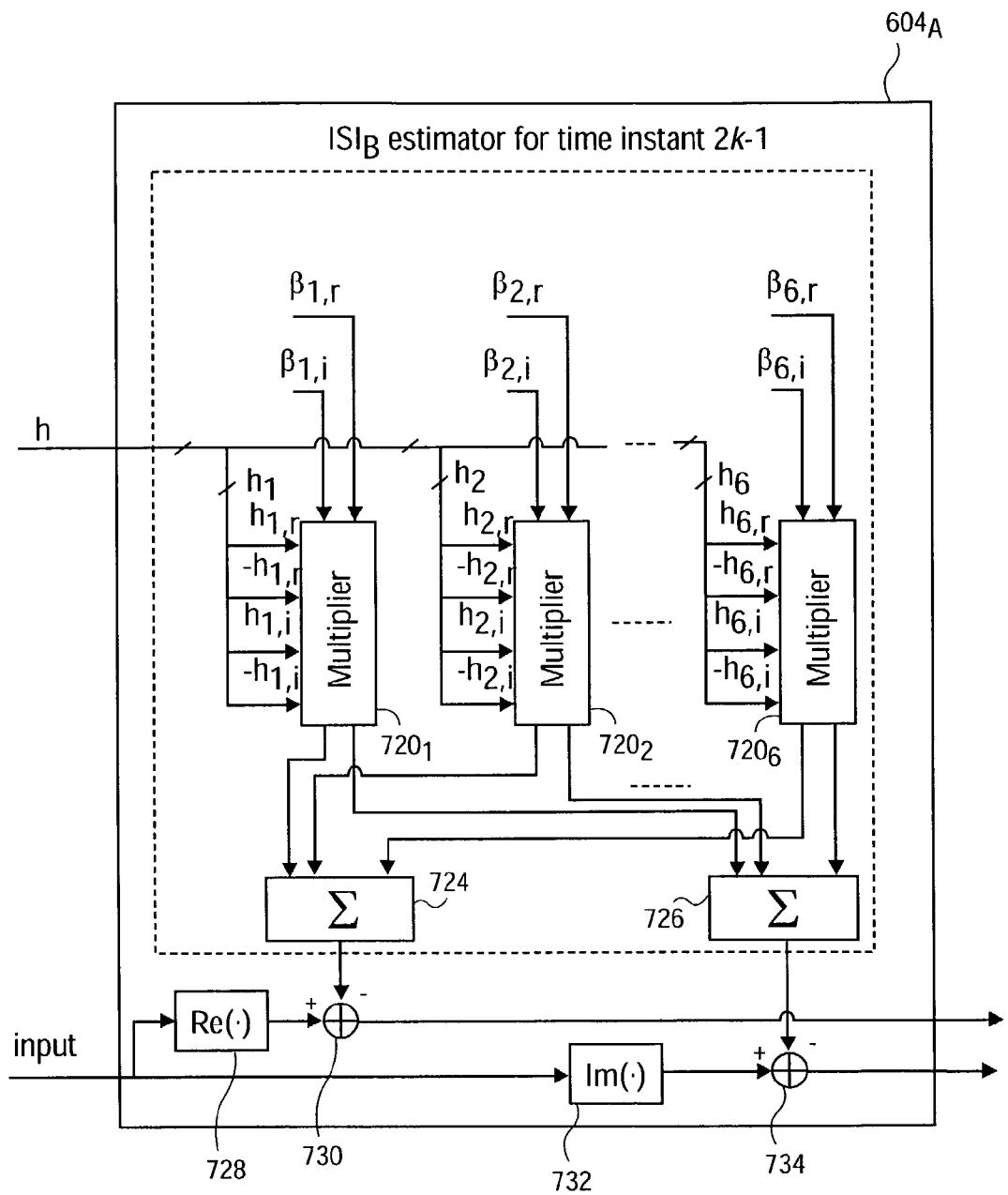
FIGS. 15A and 15B illustrate one example of detailed block diagrams of $ISI_B$ estimators at time instances $2k-1$ and $2k$, respectively, in the equalizer and branch metric calculator of FIG. 13.
Figure 15B:
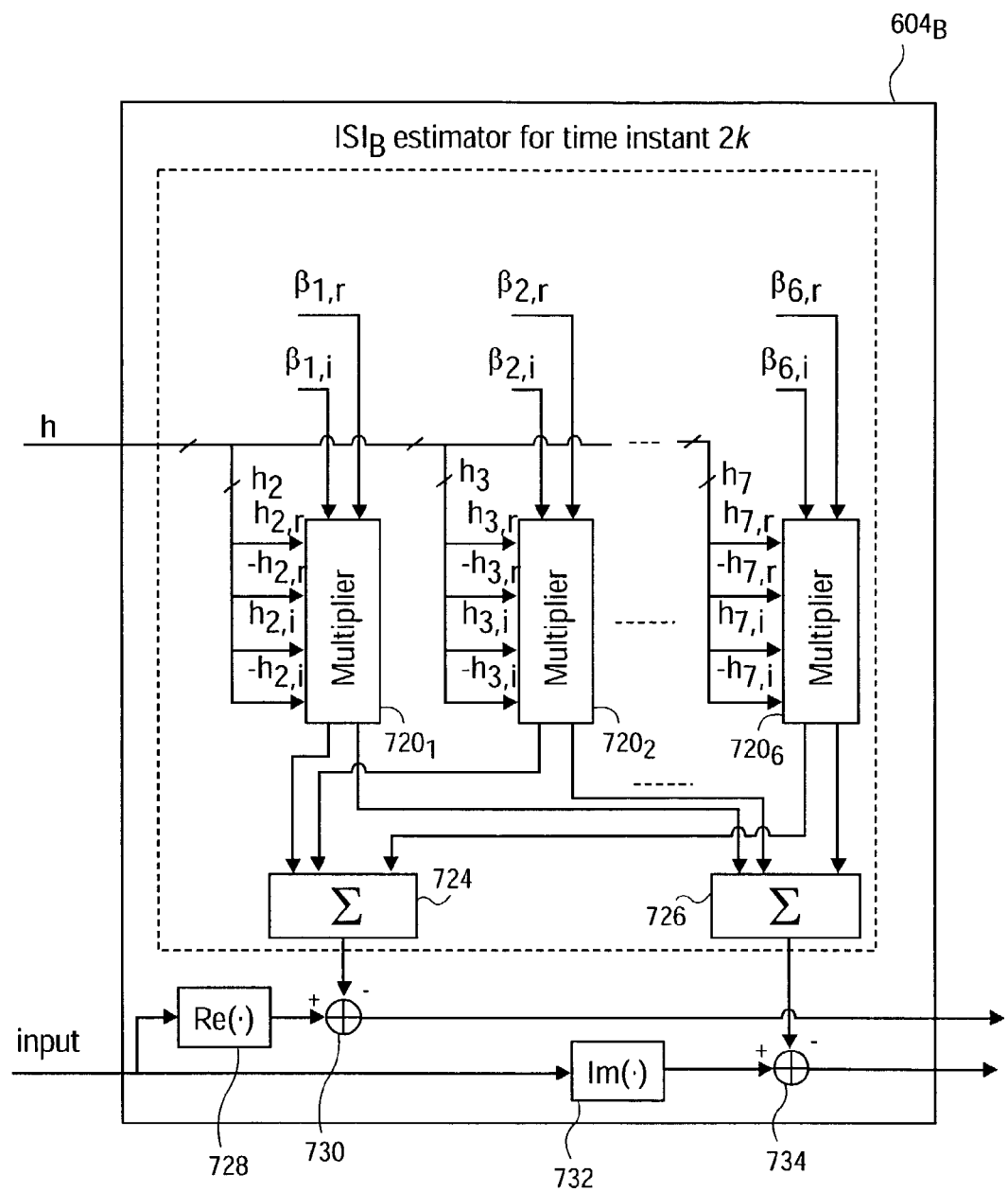

FIGS. 15A and 15B illustrate one example of detailed block diagrams of $ISI_B$ estimators $604_A$ and $604_B$ for time instances at 2k-1 and 2k, respectively, in the metric calculator of FIG. 13.

Referring to FIG. 15A, $ISI_B$ estimator $604_A$ can be a complex-number FIR filter with 6 elements $\beta_1, \ldots, \beta_6$ and 6 filter coefficients $h_1, \ldots, h_6$. The following equation can be used to determine the $ISI_B$ for time instant 2k-1 (denoted by $ISI_{B,2k-1}$):

$$ISI_{B,2k-1} = \sum_{m=1}^{6} h_m^* \cdot \beta_m, \; \beta_m \in \{0, \pm 1, \pm j\}$$

The $\beta_1, \ldots, \beta_6, h_1, \ldots, h_6$ are all complex values having real and imaginary parts. The filter coefficients $h_1, \ldots, h_6$ are extracted from the channel impulse response h=($h_0, h_1, \ldots, h_L$), which is supplied from the channel estimator 260. The $\{\beta_m\}$ stores CCK symbols on the surviving path for state $s_{k-1}$. Initially, when decoding a new CCK codeword, the $\{\beta_m\}$ for the calculation in section 1 of the CCK diagram are denoted by $(\beta_1, \ldots, \beta_6)_1$, and are all set to zero because the surviving path for state $s_0$ is null. That is, $(\beta_1, \ldots, \beta_6)_1 = (0,0,0,0,0,0)$.

For a given kth section of the trellis diagram, the elements $\{\beta_m\}$ for the calculation in the kth section, denoted by $(\beta_1, \ldots, \beta_7)_k$, are set to:

$(\beta_1, \ldots, \beta_6)_k = (d_{(k-1)N}, d_{(k-1)N-1}, \ldots, d_1, 0, \ldots, 0)$ where $(d_1, d_2, \ldots, d_{(k-1)N})$ denote the symbols on the surviving path for the state $s_{k-1}$ and $d_1$ is first in time.

The subscripts r and i are used to denote the real part and imaginary part of the quantity, respectively. The multipliers $720_1$ to $720_6$ perform the multiplication $h_m^* \cdot \beta_m$. These multipliers can be implemented using the same multiplier described in FIG. 8. The real and imaginary part of each multiplier are summed by adders 724 and 726, respectively. The outputs of these two adders are then subtracted from the real part and imaginary part of the input by subtractors 730 and 734, respectively.

Referring to FIG. 15B, $ISI_B$ estimator $604_B$ can be a complex-number FIR filter with 6 elements $\beta_1, \ldots, \beta_6$ and 6 filter coefficients $h_2, \ldots, h_7$. The following equation can be used to determine the $ISI_B$ for time instant 2k(denoted by $ISI_{B,2k}$):

$$ISI_{B,2k} = \sum_{m=1}^{6} h_{m+1}^* \cdot \beta_m, \beta_m \in \{0, \pm 1, \pm j\}$$

where $\beta_1, \ldots, \beta_6$ are the same as those in FIG. 15A. The multipliers $720_1$ to $720_6$, adders 724 and 726, and subtractors 730 and 734 operate in the same manner as in FIG. 15A.

Figure 16A:
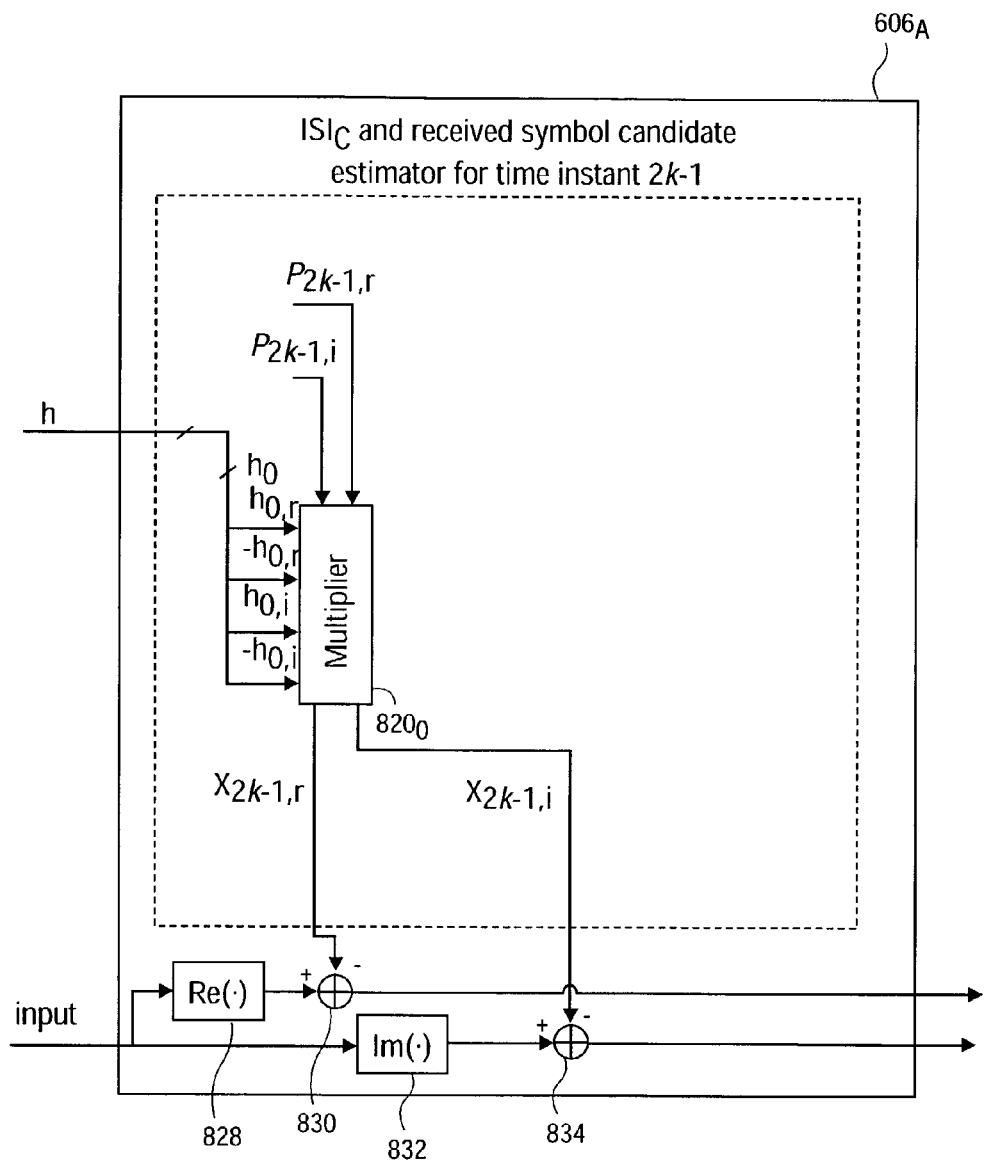
FIGS. 16A and 16B illustrate one example of detailed block diagrams of $ISI_C$ and received symbol candidate estimators at time instances $2k-1$ and $2k$, respectively, in the equalizer and branch metric calculator of FIG. 13.

Referring to FIG. 16A, the $ISI_C$ and received symbol candidate estimator $606_A$ includes a multiplier $820_0$, real and imaginary parts 828 and 832 of an input signal, respectively, and subtractors 830 and 834. For the branch between state $s_{k-1}$ and state $s_k$ in kth section of the CCK diagram and the branch label is $(p_{2k-1}, p_{2k})$, the $p_{2k-1}$ is first in time. In the case of time instant $2k-1$, the first metric branch is encountered, thus, there will be no past symbol of the branch label at time instant $2k-1$. In this case, the $ISI_C$ for time instant $2k-1$ equals to zero. Additionally, the received symbol candidate x for time instant $2k-1$, denoted by $x_{2k-1}$, can be estimated as follows:

$$x_{2k-1} = h_0 * p_{2k-1}.$$

where the filter coefficients $h_0$ are extracted from the channel impulse response $h=(h_0, h_1, \ldots, h_L)$, which is supplied from the channel estimator 260.

The real and imaginary output parts of multiplier $820_0$ are subtracted from the real part 828 and imaginary part 832 of the input by subtractors 830 and 834, respectively.

Figure 16B:
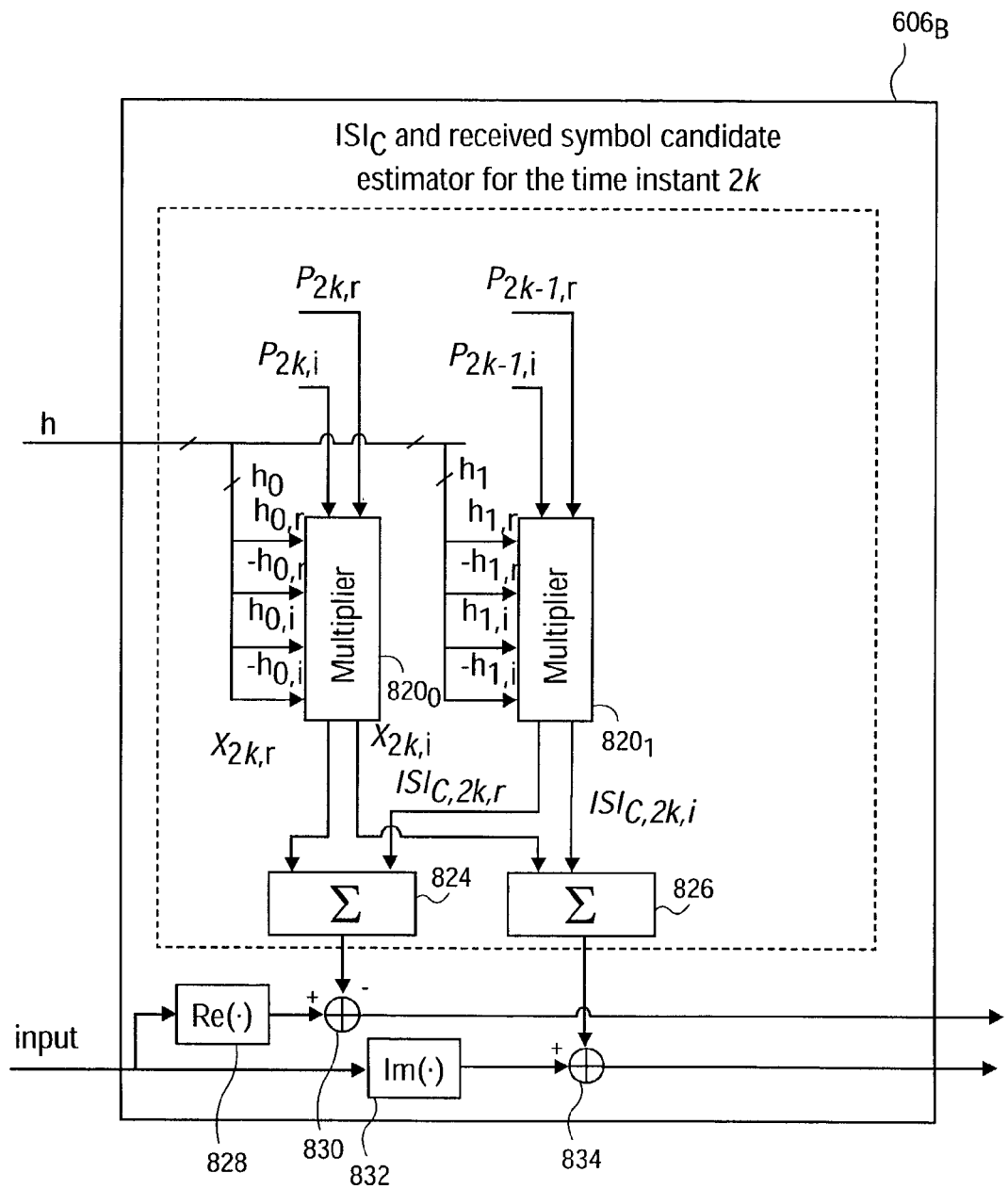

Referring to FIG. 16B, the $ISI_C$ and received symbol candidate estimator $606_B$ includes multipliers $820_0$ and $820_1$, adders 824 and 826, real and imaginary parts 828 and 832 of an input signal, respectively, and subtractors 830 and 834. For time instant $2k$, the first symbol $p_{2k-1}$ of the branch label can cause ISI to the symbol received at time instant $2k$. The $ISI_C$ for time instant $2k$, denoted by $ISI_{C,2k}$, can be estimated as follows:

$$ISI_{C,2k} = h_1 * p_{2k-1}.$$

The received symbol candidate x for time instant $2k$, denoted by $x_{2k}$, can be estimated as follows:

$$x_{2k} = h_0 * p_{2k}$$

where the filter coefficients $h_0$, $h_1$ are extracted from the channel impulse response $h=(h_0, h_1, \ldots, h_L)$.

The subscripts r and i are used to denote the real part and imaginary part of the quantity, respectively. The multipliers $820_0$ and $820_1$ perform the above multiplication. The real and imaginary parts of each multiplier are summed by adders 824 and 826, respectively. The outputs of these two adders are then subtracted from the real part 828 and imaginary part 832 of the input by subtractors 830 and 834, respectively.

Thus, a method and system for estimating block codes by calculating a path metric according to a decision feedback sequence estimation algorithm have been described. In the foregoing specification, the invention has been described with reference to specific exemplary implementations. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. In a detector for detecting block codewords contained in a received signal, the detector including a metric calculator to calculate a branch metric for a branch emanating from a state in a trellis diagram, the metric calculator comprising:

a first filter set to estimate intersymbol interference ($ISI_A$) based on previously block codewords and a channel impulse response and to subtract the estimated $ISI_A$ from a received symbol in a block codeword;

a second filter set to estimate intersymbol interference ($ISI_B$) based on a surviving path in the trellis diagram and the channel impulse response and subtract the estimated $ISI_B$ from output of the first filter set; and a third filter set to estimate an intersymbol interference ($ISI_C$) and a received symbol candidate based on symbols associated with a branch and the channel impulse response and to subtract the estimated $ISI_C$ and the received symbol candidate from the output of the second filter set, and calculate a distance measurement between the received symbol and received symbol candidate and an estimated overall ISI in order to provide the branch metric.

2. The metric calculator of claim 1, wherein block codewords are complementary code keying (CCK) codes.

3. The metric calculator of claim 1, wherein the first filter set includes a single $ISI_A$ estimator block to estimate the $ISI_A$.

4. The metric calculator of claim 3, wherein the single $ISI_A$ estimator block includes:

a plurality of delay elements to provide symbols of previously detected block codewords;

a plurality of multipliers to multiply channel impulse response values with the output of the delay elements, the output of each multiplier having a real part and an imaginary part;

a first adder to add the real parts of the outputs of the multipliers;

a second adder to add the imaginary parts of the outputs of the multipliers;

a first subtractor to subtract the output of the first adder from a real part of a received symbol; and a second subtractor to subtract the output of the second adder from an imaginary part of the received symbol.

5. The metric calculator of claim 3, wherein the single $ISI_A$ estimator includes:

a plurality of delay elements to provide symbols of previously detected block codewords;

a plurality of multipliers to multiply channel impulse response values with the output of the delay elements, the output of each multiplier having a real part and an imaginary part;

a plurality of switches to selectively receive the real parts and imaginary parts of the output of the multipliers;

an adder to add the outputs of the switches;

an input side switch to selectively receive a real part and imaginary part of a received symbol;

a subtractor to subtract the output of the adder from the output of the input side switch; and an output side switch to selectively output a real part and an imaginary part of the output of the subtractor.

6. The metric calculator of claim 1, wherein the second filter set includes a plurality of $ISI_B$ estimator blocks equal to a number of states in a section of the trellis diagram.

7. The metric calculator of claim 6, wherein each $ISI_B$ estimator block includes:
- a plurality of delay elements to provide symbols of a surviving path in the trellis diagram;
- a plurality of multipliers to multiply channel impulse response values with the output of the delay elements, the output of each multiplier having a real part and an imaginary part;
- a first adder to add the real parts of the outputs of the multipliers;
- a second adder to add the imaginary parts of the outputs of the multipliers;
- a first subtractor to subtract the output of the first adder from a real part of an input to the $ISI_B$ estimator block; and
- a second subtractor to subtract the output of the second adder from an imaginary part of the input of the $ISI_B$ estimator block.

8. The metric calculator of claim 6, wherein each $ISI_B$ estimator block includes:
- a plurality of delay elements to provide symbols of a surviving path in the trellis diagram;
- a plurality of multipliers to multiply channel impulse response values with the output of the delay elements, the output of each multiplier having a real part and an imaginary part;
- a plurality of switches to selectively receive the real parts and imaginary parts of the output of the multipliers;
- an adder to add the outputs of the switches;
- an input side switch to selectively receive a real part and imaginary part of an input to the $ISI_B$ estimator block;
- a subtractor to subtract the output of the adder from the output of the input side switch; and
- an output side switch to selectively output a real part and imaginary part of the output of the subtractor.

9. The metric calculator of claim 1, wherein the third filter set includes a plurality of $ISI_C$ and received symbol candidate estimator blocks equal to a number of branches in a section of the trellis diagram.

10. The metric calculator of claim 9, wherein each $ISI_C$ and received symbol candidate estimator block includes:
- a plurality of delay elements to provide branch labels of a branch within a section of the trellis diagram;
- a plurality of multipliers to multiply channel impulse response values with the output of the delay elements, the output of each multiplier having a real part and an imaginary part;
- a first adder to add the real parts of the outputs of the multipliers;
- a second adder to add the imaginary parts of the outputs of the multipliers;
- a first subtractor to subtract the output of the first adder from a real part of an input to the $ISI_C$ and received symbol candidate estimator block;
- a first processing unit to square the output of the first subtractor to provide a distance measurement between a real part of a received symbol and a real part of a received symbol candidate and to calculate an overall ISI;
- a second subtractor to subtract the output of the second adder from an imaginary part of the input of the $ISI_C$ and received symbol candidate estimator block;
- a second processing unit to square the output of the second subtractor to provide a distance measurement between an imaginary part of the received symbol and an imaginary part of the received symbol candidate and to calculate an overall ISI;
- a third adder to add a previous output of the third adder to the sum of the real and imaginary distance measurements output from the first and second processing units; and
- a switch to selectively output the branch metric from the third adder.

11. The metric calculator of claim 10, wherein the switch outputs the branch metric periodically with a period N·T where N is a number of symbols in the branch label and T is a symbol duration.

12. The metric calculator of claim 9, wherein each $ISI_C$ and received symbol candidate estimator block includes:
- a plurality of delay elements to provide branch labels of a branch within a section of the trellis diagram;
- a plurality of multipliers to multiply channel impulse response values with the output of the delay elements, the output of each multiplier having a real part and an imaginary part;
- a plurality of switches to selectively receive real and imaginary parts of the output of the multipliers;
- a first adder to add the outputs of the switches;
- an input side switch to selectively receive a real part and imaginary part of an input to the $ISI_C$ and received symbol candidate estimator block;
- a subtractor to subtract the output of the adder from the output of the input side switch;
- a processing unit to square the output of the first subtractor to provide a distance measurement between a real part or imaginary part of a received symbol and a received symbol candidate and to calculate an overall ISI;
- a second adder to add a previous output of the second adder with the distance measurement output from the processing unit; and
- an output side switch to selectively output the branch metric from the second adder.

13. The metric calculator of claim 12, wherein the output side switch outputs the received symbol candidate periodically within a period N·T where N is a number of symbols in the branch label and T is a symbol duration.

14. In a detector for detecting block codewords contained in a received signal, the detector including a metric calculator to calculate a branch metric for a branch emanating from a state in a trellis diagram, the metric calculator comprising:
- a demultiplexer to receive a plurality of received symbols contained in a block codeword and to output a first set of symbols at a time first and a second set of symbols at a second time;
- a first filter set to estimate intersymbol interference ($ISI_A$) at the first and second times based on previously detected codewords and a channel impulse response and to subtract the estimated $ISI_A$ at the first and second times from the first and second set of symbols, respectively;
- a second filter set to estimate intersymbol interference ($ISI_B$) based on symbols of a surviving path in the trellis diagram and on a channel impulse response, and subtract the estimated $ISI_B$ at the first and second times from the output of the first filter set at the first and second times, respectively; and
- a third filter set to estimate an intersymbol interference ($ISI_C$) and a received symbol candidate at the first and second times based on symbols associated with a branch and a channel impulse response, subtract the estimated $ISI_C$ and received symbol candidates at the first and second time from the output of the second filter set at the first and second times, respectively;

a plurality of processing units to calculate a distance measurement between real and imaginary parts of the received symbol and received symbol candidate and to calculate an overall ISI; and an adder to add the outputs of the processing units in order to provide the branch metric.

15. The metric calculator of claim 14, wherein the type of block codewords includes a complementary code keying (CCK) code.

16. The metric calculator of claim 14, wherein the first filter set includes a first $ISI_A$ estimator block to estimate the $ISI_A$ at the first time and a second ISIA estimator to estimate the ISIA at the second time.

17. The metric calculator of claim 16, wherein the first $ISI_A$ estimator block includes:
   a plurality of delay elements to provide symbols of previously detected block codewords;
   a plurality of multipliers to multiply channel impulse response values with the output of the delay elements, the output of each multiplier having a real part and an imaginary part;
   a first adder to add the real parts of the outputs of the multipliers;
   a second adder to add the imaginary parts of the outputs of the multipliers;
   a first subtractor to subtract the output of the first adder from a real part of a received symbol at the first time; and
   a second subtractor to subtract the output of the second adder from an imaginary part of the received symbol at the first time.

18. The metric calculator of claim 16, wherein the second $ISI_A$ estimator includes:
   a plurality of delay elements to provide symbols of previously detected block codewords;
   a plurality of multipliers to multiply channel impulse response values with the output of the delay elements, the output of each multiplier having a real part and an imaginary part;
   a first adder to add the real parts of the outputs of the multipliers;
   a second adder to add the imaginary parts of the outputs of the multipliers;
   a first subtractor to subtract the output of the first adder from a real part of a received symbol at the second time; and
   a second subtractor to subtract the output of the second adder from an imaginary part of the received symbol at the second time.

19. The metric calculator of claim 14, wherein the second filter set includes a first $ISI_B$ estimator block to estimate the $ISI_B$ at the first time and a second $ISI_B$ estimator to estimate the $ISI_B$ at the second time.

20. The metric calculator of claim 19, wherein the first $ISI_B$ estimator block includes:
   a plurality of delay elements to provide symbols of a surviving path in a trellis diagram at the first time;
   a plurality of multipliers to multiply channel impulse response values with the output of the delay elements, the output of each multiplier having a real part and an imaginary part;
   a first adder to add the real parts of the outputs of the multipliers;
   a second adder to add the imaginary parts of the outputs of the multipliers;
   a first subtractor to subtract the output of the first adder from a real part of an input to the first $ISI_B$ estimator block at the first time; and
   a second subtractor to subtract the output of the second adder from an imaginary part of the input to the ISIB estimator block at the first time.

21. The metric calculator of claim 19, wherein the second $ISI_B$ estimator includes:
   a plurality of delay elements to provide symbols of a surviving path in a trellis diagram at the second time;
   a plurality of multipliers to multiply channel impulse response values with the output of the delay elements, the output of each multiplier having a real part and an imaginary part;
   a first adder to add the real parts of the outputs of the multipliers;
   a second adder to add the imaginary parts of the outputs of the multipliers;
   a first subtractor to subtract the output of the first adder from a real part of an input to the second $ISI_B$ estimator block at the second time; and
   a second subtractor to subtract the output of the second adder from an imaginary part of the input to the second $ISI_B$ estimator block at the second time.

22. The metric calculator of claim 14, wherein the third filter set includes a first $ISI_C$ and received symbol candidate estimator block to estimate the $ISI_C$ and the received symbol candidate at the first time and a second $ISI_C$ and received symbol candidate estimator block to estimate the $ISI_C$ and received symbol candidate at the second time.

23. The metric calculator of claim 22, wherein the first $ISI_C$ and received symbol candidate estimator block includes:
   a multiplier to multiply symbols in a branch label with channel impulse response values, the output of the multiplier having a real part and an imaginary part;
   a first subtractor to subtract the real part of the output of the multiplier from an input to the first $ISI_C$ and received symbol candidate estimator block at the first time; and
   a second subtractor to subtract the imaginary part of the output of the multiplier from an imaginary part of the input to the first $ISI_C$ and received symbol candidate estimator block at the first time.

24. The metric calculator of claim 22, wherein the second $ISI_C$ and received symbol candidate estimator block includes:
   a plurality of multipliers to multiply symbols in a branch label with channel impulse response values, the output of each of the multipliers having a real part and an imaginary part;
   a first adder to add the real parts of the outputs of the multipliers;
   a second adder to add the imaginary parts of the outputs of the multipliers;
   a first subtractor to subtract the output of the first adder from a real part of an input to the second $ISI_C$ and received symbol candidate estimator block at the second time; and
   a second subtractor to subtract the output of the second adder from an imaginary part of the input to the second $ISI_C$ received symbol candidate estimator block at the second time.

* * * * *